United States Patent
Soave

(10) Patent No.: US 9,781,696 B1
(45) Date of Patent: Oct. 3, 2017

(54) ACTIVITY-TRIGGERED PROVISIONING OF PORTABLE WIRELESS NETWORKS

(71) Applicant: Mario Soave, Union City, NJ (US)

(72) Inventor: Mario Soave, Union City, NJ (US)

(*) Notice: Subject to any disclaimer, the term of this patent is extended or adjusted under 35 U.S.C. 154(b) by 0 days.

(21) Appl. No.: 15/221,411

(22) Filed: Jul. 27, 2016

(51) Int. Cl.
| | | |
|---|---|---|
| H04W 60/04 | (2009.01) | |
| H04L 12/46 | (2006.01) | |
| H04W 12/06 | (2009.01) | |
| H04W 24/08 | (2009.01) | |
| H04W 4/02 | (2009.01) | |

(52) U.S. Cl.
CPC ......... *H04W 60/04* (2013.01); *H04L 12/4641* (2013.01); *H04W 4/025* (2013.01); *H04W 12/06* (2013.01); *H04W 24/08* (2013.01)

(58) Field of Classification Search
CPC .................................................. H04W 60/04
See application file for complete search history.

(56) References Cited

U.S. PATENT DOCUMENTS

| | | |
|---|---|---|
| 6,759,960 B2 | 7/2004 | Stewart |
| 7,903,817 B2 | 3/2011 | Cam-Winget et al. |
| 8,553,662 B2 | 10/2013 | Chen et al. |
| 8,665,744 B2 | 3/2014 | Viswanathan et al. |
| 8,813,211 B2 | 8/2014 | Baker et al. |
| 9,066,236 B2 | 6/2015 | Filippi et al. |
| 9,161,219 B2 | 10/2015 | Bryksa et al. |
| 2010/0291907 A1* | 11/2010 | MacNaughtan ... G06Q 30/0241 455/414.1 |
| 2012/0079084 A1 | 3/2012 | Forssell et al. |
| 2012/0203824 A1 | 8/2012 | Oommen |
| 2015/0124791 A1 | 5/2015 | Mazandarany et al. |
| 2016/0014824 A1* | 1/2016 | Xiang ................... H04W 16/10 370/329 |
| 2016/0261760 A1* | 9/2016 | Aso ..................... H04N 1/00307 |

OTHER PUBLICATIONS

Ch. 4 Aruba OS 61 User Guide[Online]. HP, 2012. [retrieved on Dec. 18, 2015]. Retrieved from: <URL: http://www.arubanetworks.com/techdocs/ArubaOS_61/ArubaOS_61_UG/AP_Config.php>.

* cited by examiner

*Primary Examiner* — Michael T Vu
(74) *Attorney, Agent, or Firm* — Craige Thompson; Thompson Patent Law

(57) ABSTRACT

Apparatus and associated methods relate to configuring a network remote from a user's personal network, with parameters governing the user's personal network, in response to user activity, and at a location and time based on the user activity. In an illustrative example, the network may be a Wi-Fi network. The user's personal network may be, for example, the user's home SSID for accessing the user's personal Wi-Fi access device. In some examples, the user activity may be a request for access to the remote network using the user's home SSID. The requested access may be provided at a time and location agreed to with an SSID portability provider. Various examples may advantageously provide portable access to the Internet, for example, using the user's home SSID already configured on the user's devices so that the user's devices can seamlessly and securely access the Internet via the remote network.

13 Claims, 16 Drawing Sheets

US 9,781,696 B1

ACTIVITY-TRIGGERED PROVISIONING OF PORTABLE WIRELESS NETWORKS

TECHNICAL FIELD

Various embodiments relate generally to automatic configuration of wireless communication networks in response to user activity.

BACKGROUND

Wireless networks are communication networks without wires. Wireless networking is a branch of communication networking, which includes both communication and computation. Wireless networks communicate without wires by sending and receiving data through a wireless communication channel. For example, a wireless network may communicate using a wireless channel through various types of media, including radio frequency (RF), optical, or audio channels.

Users of wireless networks include individuals, computer applications, and electronic devices. Users may employ wireless networks to access the Internet or private networks. Many wireless networks limit access to only authorized users. For example, many wireless networks are configured to satisfy the requirements of an individual or organization. Some networks are employed to communicate with or control attached devices. Access to devices attached to a network may be limited by the network's parameters. For example, many wireless networks are configured with network parameters governing access to one or more network or attached devices. Devices attached to a network are typically configured to match the network parameters.

Network parameters governing access to a wireless network and attached devices include encryption type, network identification, and identification of the user or device accessing the wireless network. Many devices are portable and suitable for mobile use. Some devices are embedded in various types of equipment, or wearable by an individual user. Mobile users away from their personal network typically reconfigure their mobile devices for access. Mobile access may be to a different network, governed by parameters different from the user's personal network, or to a network which may be unsecured. A user of many devices attached to a wireless network may be required to change the parameters governing access to the wireless network in each device when the network parameters change.

SUMMARY

Apparatus and associated methods relate to configuring a network remote from a user's personal network, with parameters governing the user's personal network, in response to user activity, and at a location and time based on the user activity. In an illustrative example, the network may be a Wi-Fi network. The user's personal network may be, for example, the user's home SSID for accessing the user's personal Wi-Fi access device. In some examples, the user activity may be a request for access to the remote network using the user's home SSID. The requested access may be provided at a time and location agreed to with an SSID portability provider. Various examples may advantageously provide portable access to the Internet, for example, using the user's home SSID already configured on the user's devices so that the user's devices can seamlessly and securely access the Internet via the remote network.

Apparatus and associated methods relate to configuring a network remote from a user's personal network, with parameters governing the user's personal network, in response to user activity, and at a location and time based on the user activity. In an illustrative example, the network may be a Wi-Fi network. The user's personal network may be, for example, the user's home SSID for accessing the user's personal Wi-Fi access device. In some examples, the user activity may be a product or service transaction. Access to the remote network using the user's home SSID may be provided at a time and location based on the product or service transaction. Various examples may advantageously provide portable access to the Internet, for example, using the user's home SSID already configured on the user's devices so that the user's devices can seamlessly and securely access the Internet via the remote network.

Apparatus and associated methods relate to configuring a network remote from a user's personal network, with parameters governing the user's personal network, in response to user activity, and at a location and time based on the user activity. In an illustrative example, the network may be a Wi-Fi network. The user's personal network may be, for example, the user's home SSID for accessing the user's personal Wi-Fi access device. In some examples, the user activity may be a reservation of a product or service. Access to the remote network using the user's home SSID may be provided at a time and location based on the product or service reservation. Various examples may advantageously provide portable access to the Internet, for example, using the user's home SSID already configured on the user's devices so that the user's devices can seamlessly and securely access the Internet via the remote network.

Apparatus and associated methods relate to configuring a network remote from a user's personal network, with parameters governing the user's personal network, in response to user activity, and at a location and time based on the user activity. In an illustrative example, the network may be a Wi-Fi network. The user's personal network may be, for example, the user's home SSID for accessing the user's personal Wi-Fi access device. In some examples, the user activity may be the user's arrival at a location served by the remote network. Access to the remote network using the user's home SSID may be provided at a time and location based on the arrival. Various examples may advantageously provide portable access to the Internet, for example, using the user's home SSID already configured on the user's devices so that the user's devices can seamlessly and securely access the Internet via the remote network.

Apparatus and associated methods relate to configuring a network remote from a user's personal network, with parameters governing the user's personal network, in response to user activity, and at a location and time based on the user activity. In an illustrative example, the network may be a Broadband Wireless Access (BWA) network. The user's personal network may be, for example, the BWA network to which the user subscribes. In some examples, the user activity may be the user's arrival at a location served by the remote network. Access to the remote network may be provided at a time and location based on the arrival. Various examples may advantageously provide portable access to the Internet, for example, using the user's personal parameters already configured on the user's devices so that the user's devices can seamlessly and securely access the Internet via the remote network.

Apparatus and associated methods relate to configuring a network remote from a user's personal network, with parameters governing the user's personal network, in response to user activity, and at a location and time based on the user activity. In an illustrative example, the remote network may be a Wi-Fi network including the user's personal Internet of Things (IoT) devices. The user's personal network may be, for example, the user's home Wi-Fi SSID. In some examples, the user activity may be scanning a barcode identifier of an IoT device. The IoT device may be configured to access the user's personal network at a time and location based on the user activity. Various examples may advantageously provide portable access to the Internet, for example, configuring the user's home SSID on the user's IoT devices so that the IoT devices can seamlessly and securely access the Internet via the user's personal network.

Apparatus and associated methods relate to configuring a network remote from a user's personal network, with parameters governing the user's personal network, in response to user activity, and at a location and time based on the user activity. In an illustrative example, the remote network may be a Broadband Wireless Access (BWA) network including Internet of Things (IoT) devices. The user's personal network may be, for example, the user's subscribed BWA network. In some examples, the user activity may be scanning a barcode identifier of an IoT device. The IoT device may be configured to access the user's personal network at a time and location based on the user activity. Various examples may advantageously provide portable Internet access, for example, configuring the user's subscribed BWA network on the user's IoT devices so that the IoT devices can seamlessly and securely access the Internet via the user's personal network.

Various embodiments may achieve one or more advantages. For example, some embodiments may improve a user's ease of access to the Internet. This facilitation may be a result of reducing the user's effort locating mobile Internet access points and configuring the access point parameters in the user's devices. In some embodiments, portable and secure Internet access may be automatically provisioned for a user's mobile devices. Such automatic provisioning may reduce a user's exposure to cybercrime and hacking attacks. Some embodiments may coordinate locations or times related to a customer's consumption of products or services with portable network provisioning. Such association of customer interaction with products or services and available locations or times to provision portable network access for the customer may improve the customer experience. For example, a product provider may offer products or services targeted to a customer based on the customer's Internet usage patterns.

In some embodiments, the effort required by a user to configure the user's personal Internet of Things (IoT) devices may be reduced. For example, a user who has many IoT devices may change their personal network parameters, and automatically provision the IoT devices with the changed parameters governing the user's personal network. Some embodiments may improve a product or service provider's customer relationships. This facilitation may be a result of a portability provider sharing a portability user's network usage statistics with a product provider. For example, a dinner guest arriving early for a reservation at a location and time when portable Internet access was provisioned for the user's device, but whose device does not access the network until thirty minutes after the reservation, may indicate an opportunity for the restaurant to improve the customer experience.

The details of various embodiments are set forth in the accompanying drawings and the description below. Other features and advantages will be apparent from the description and drawings, and from the claims.

BRIEF DESCRIPTION OF THE DRAWINGS

FIG. 9 depicts a process flow of an exemplary Portability Provider configuring a remote Wi-Fi access point with parameters generated by the Portability Provider based on a user's relationship with an exemplary Product Provider, in response to the user's check-in.

Like reference symbols in the various drawings indicate like elements.

DETAILED DESCRIPTION OF ILLUSTRATIVE EMBODIMENTS

Figure 10:
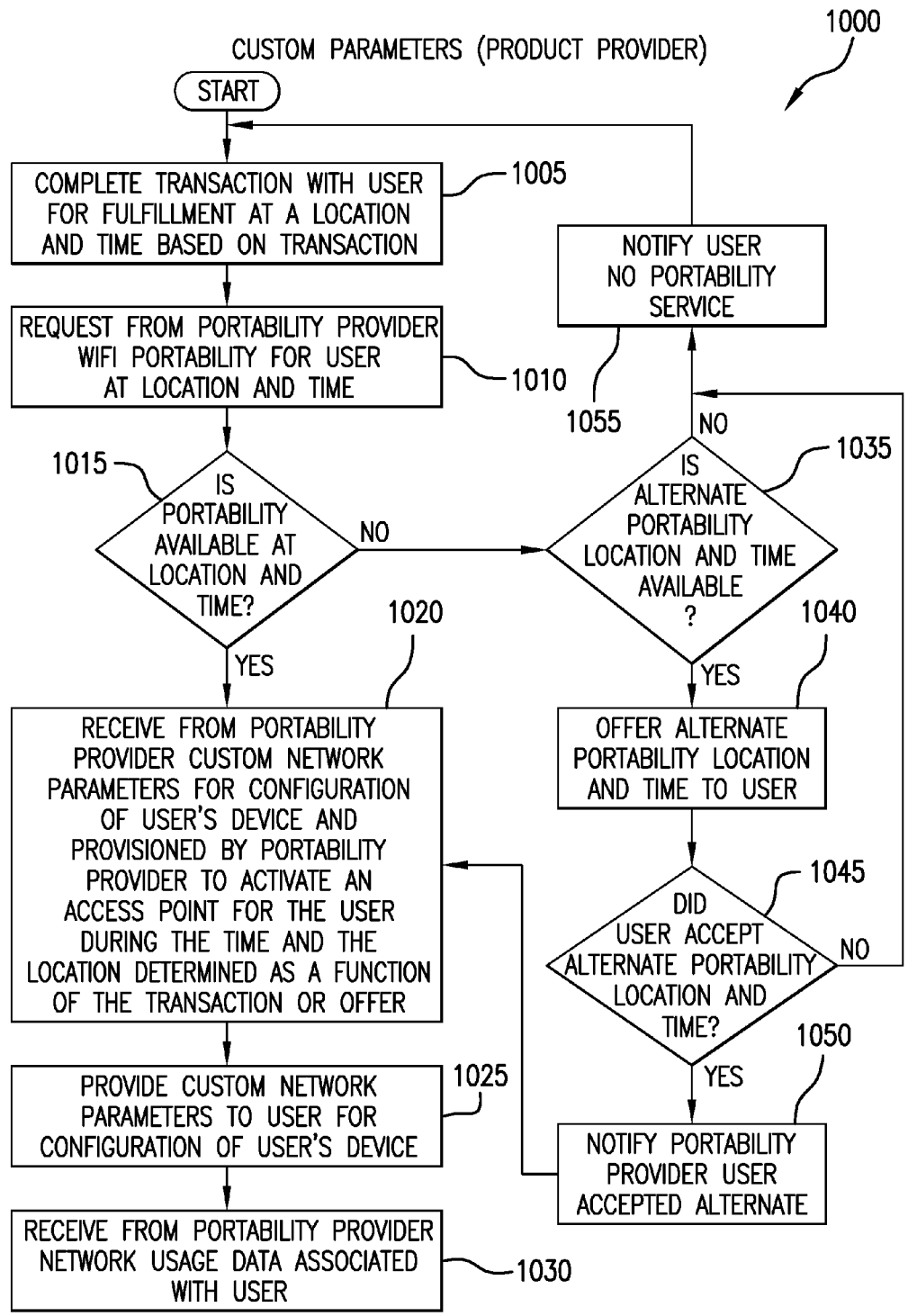
FIG. 10 depicts a process flow of an exemplary Product Provider configuring a remote Wi-Fi access point with parameters generated by a Portability Provider based on a user's relationship with the Product Provider, in response to the user's transaction with the Product Provider.
Figure 11:
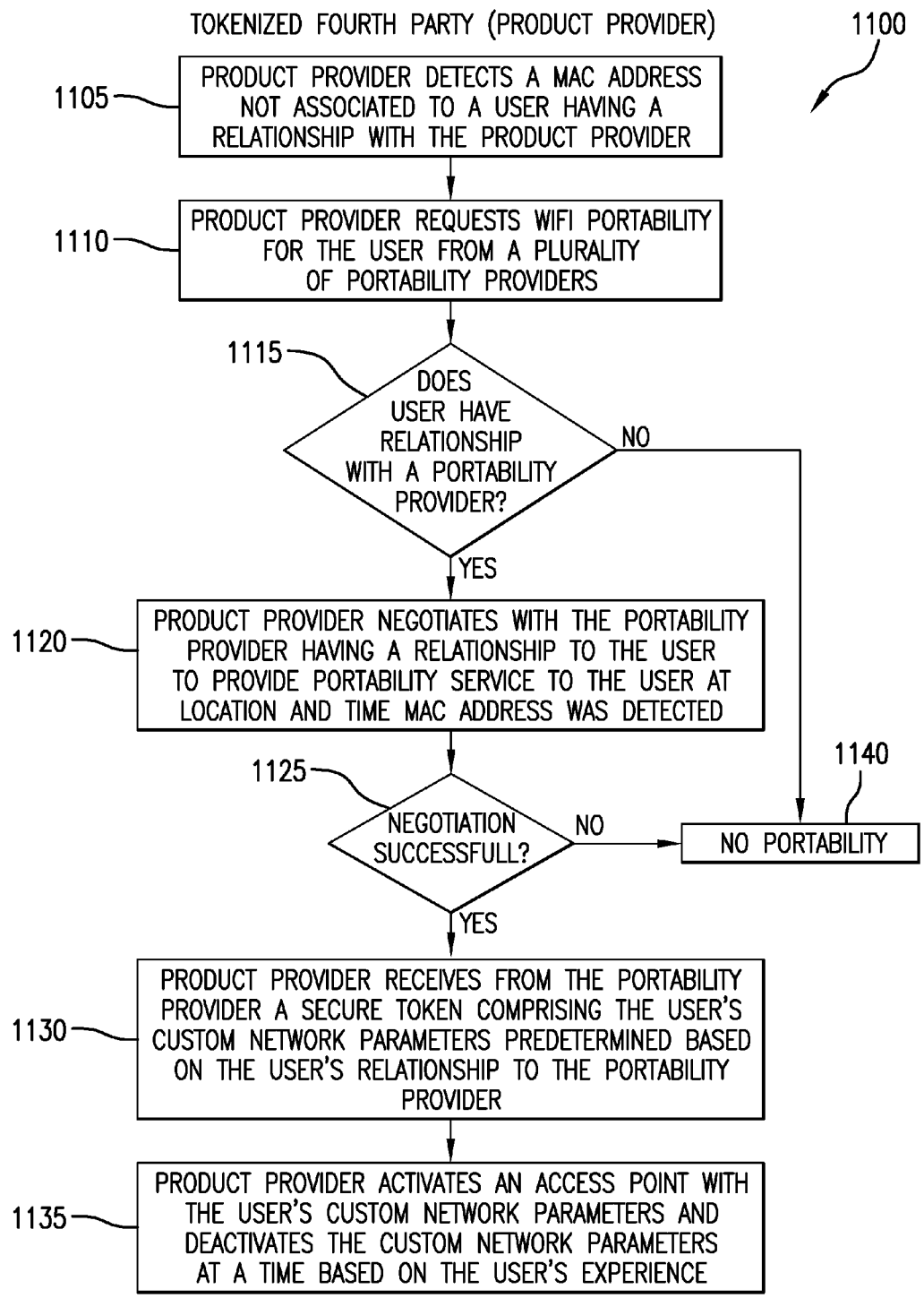
FIG. 11 depicts a process flow of an exemplary Product Provider collaborating with at least one Portability Provider to configure a remote Wi-Fi access point with parameters predetermined based on a user's relationship to at least one Portability Provider.
Figure 12:
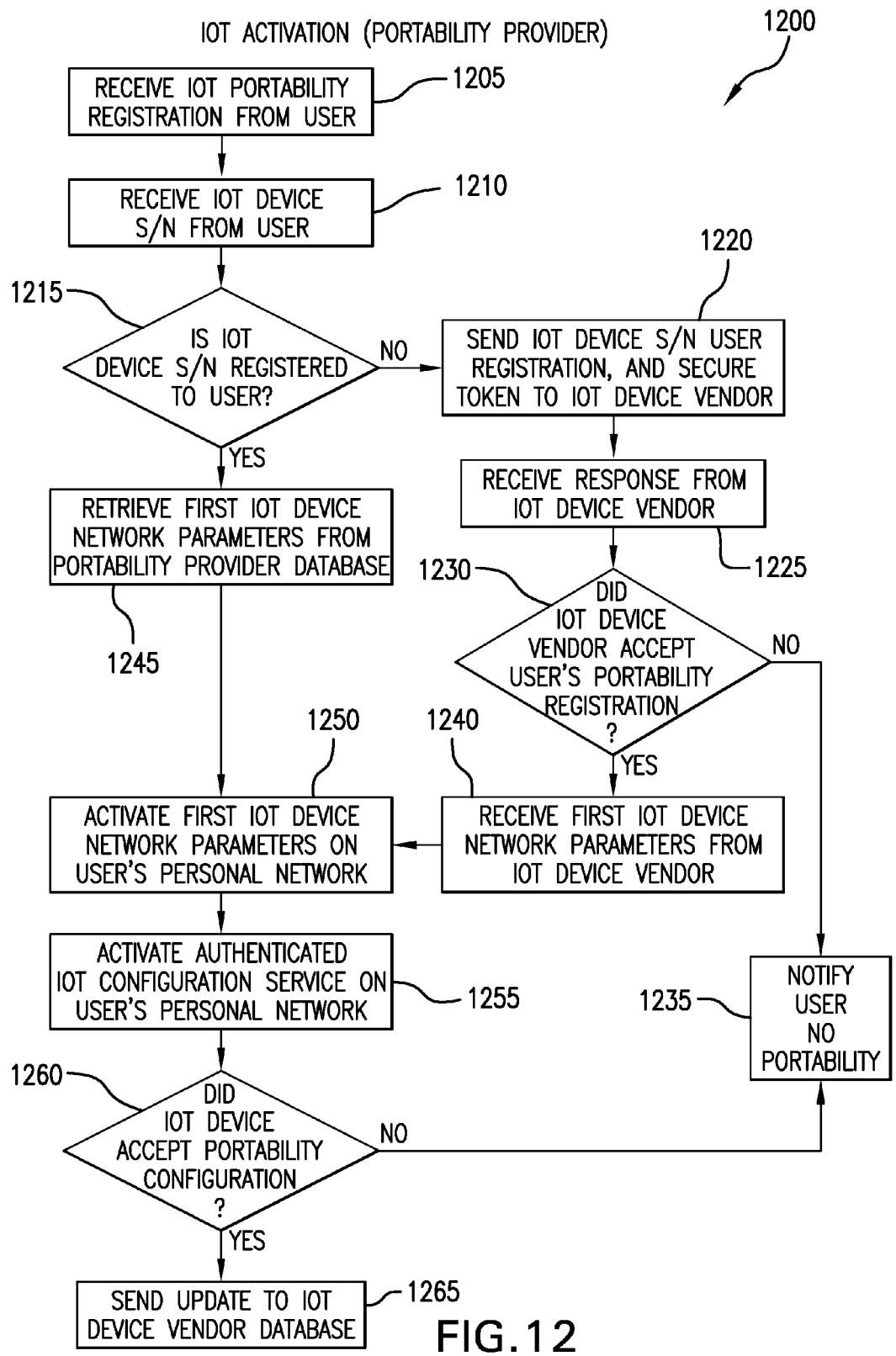
FIG. 12 depicts a process flow of an exemplary Portability Provider configuring a user's Internet of Things (IoT) devices with parameters governing the user's personal network, in response to the user providing the IoT device identifier to the Portability Provider.
Figure 13:
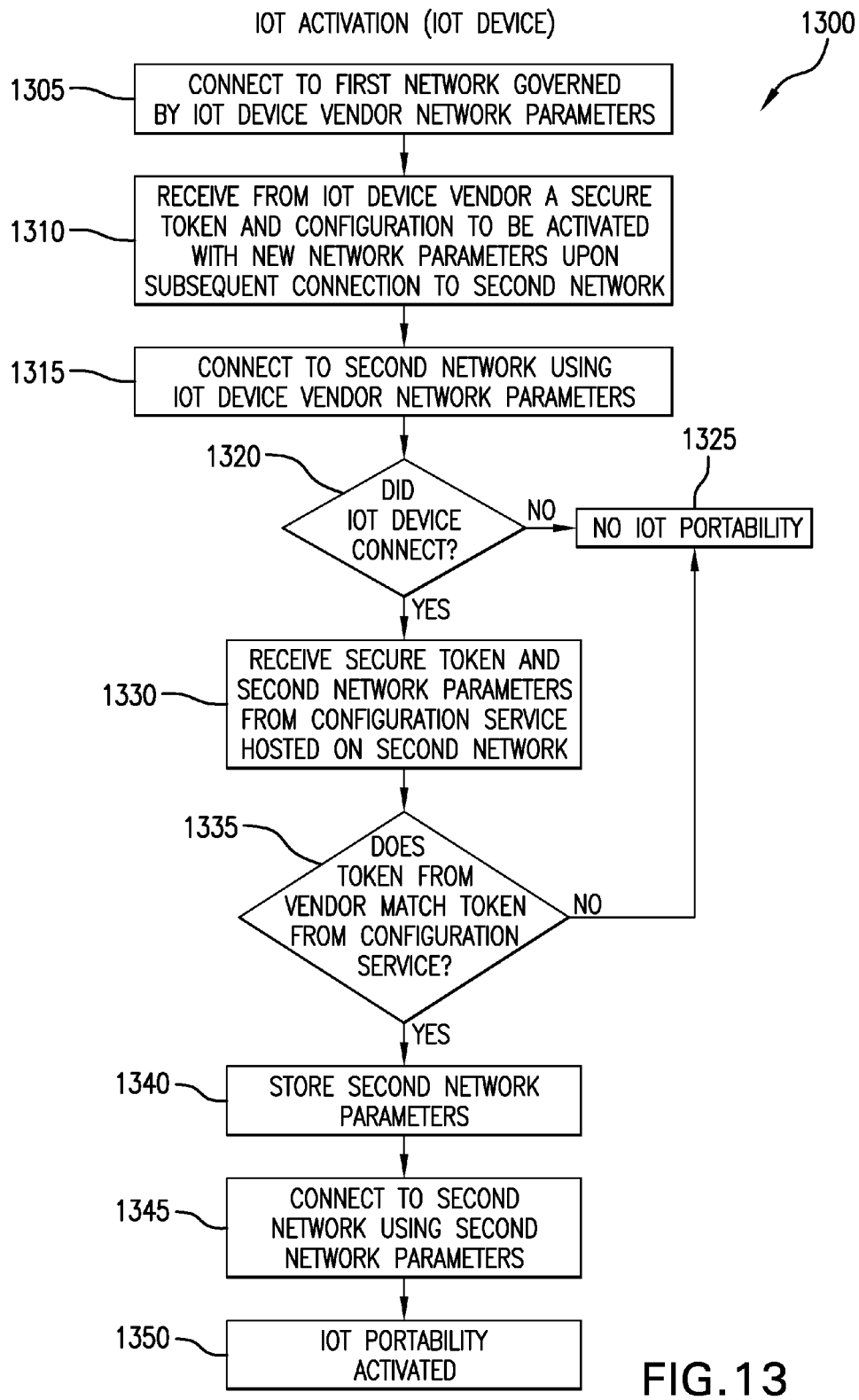
FIG. 13 depicts a process flow by an exemplary Internet of Things (IoT) device being configured with parameters governing a user's personal network, in response to the user providing the IoT device identifier to the Portability Provider.

To aid understanding, this document is organized as follows. First, an illustrative collaboration among an exemplary Portability Provider and an exemplary Product Provider, to configure a remote Wi-Fi access point with parameters governing a user's personal network, in response to user activity, is briefly introduced with reference to FIG. 1. Second, with reference to FIG. 2, the discussion turns to exemplary embodiments that illustrate collaboration among an exemplary Portability Provider and an exemplary Product Provider, to configure a user's Internet of Things (IoT) devices with parameters governing the user's personal network, in response to the user scanning the barcoded serial number of an IoT device. Then, exemplary communication between an exemplary Product Provider, Portability Provider, and user, to configure a remote Wi-Fi access point with parameters governing the user's personal network, will be described from the perspective of the user with reference to FIGS. 3A-3B. Next, with reference to FIG. 4, exemplary entity database records accessible to an exemplary Product Provider and Portability Provider will be presented. Next, the structure of an exemplary mobile device and the user interface of an exemplary mobile application to manage portable Wi-Fi service will be described with reference to FIGS. 5A-5D. Then, the structure of an exemplary access point having a Portability Management Engine (PME) will be presented with reference to FIG. 6. Next, an exemplary Portability Management Engine (PME) process flow will be described with reference to FIG. 7. Then, with reference to FIG. 8, interaction between an exemplary Product Provider and Portability Provider, to configure a remote Wi-Fi access point with parameters governing the user's personal network based on a transaction between the user and the Product Provider, will be described from the perspective of the Portability Provider. Next, with reference to FIG. 9, interaction between an exemplary Product Provider and Portability Provider, to configure a remote Wi-Fi access point with parameters generated by the Portability Provider, in response to the user's arrival and based on a relationship between the user and the Product Provider, will be described from the perspective of the Product Provider. With reference to FIG. 10, interaction between an exemplary Product Provider and Portability Provider, to configure a remote Wi-Fi access point with parameters generated by a Portability Provider based on a user's relationship with the Product Provider, and in response to the user's transaction with the Product Provider, will be described. Then, with reference to FIG. 11, illustrative interaction between an exemplary Product Provider collaborating with at least one exemplary Portability Provider to configure a remote Wi-Fi access point with parameters predetermined based on a user's relationship to at least one Portability Provider will be presented. Next, with reference to FIG. 12, illustrative interaction between an exemplary Portability Provider and an exemplary Internet of Things (IoT) device vendor configuring a user's IoT devices with parameters governing the user's personal network, in response to the user providing the IoT device identifier to the Portability Provider, will be described from the perspective of the Portability Provider. Finally, with reference to FIG. 13, illustrative interaction between an exemplary Portability Provider, an exemplary IoT device vendor, and an exemplary IoT device configuring a user's IoT devices with parameters governing the user's personal network, in response to the user providing the IoT device identifier to the Portability Provider, will be described from the perspective of the IoT device.

Figure 1:
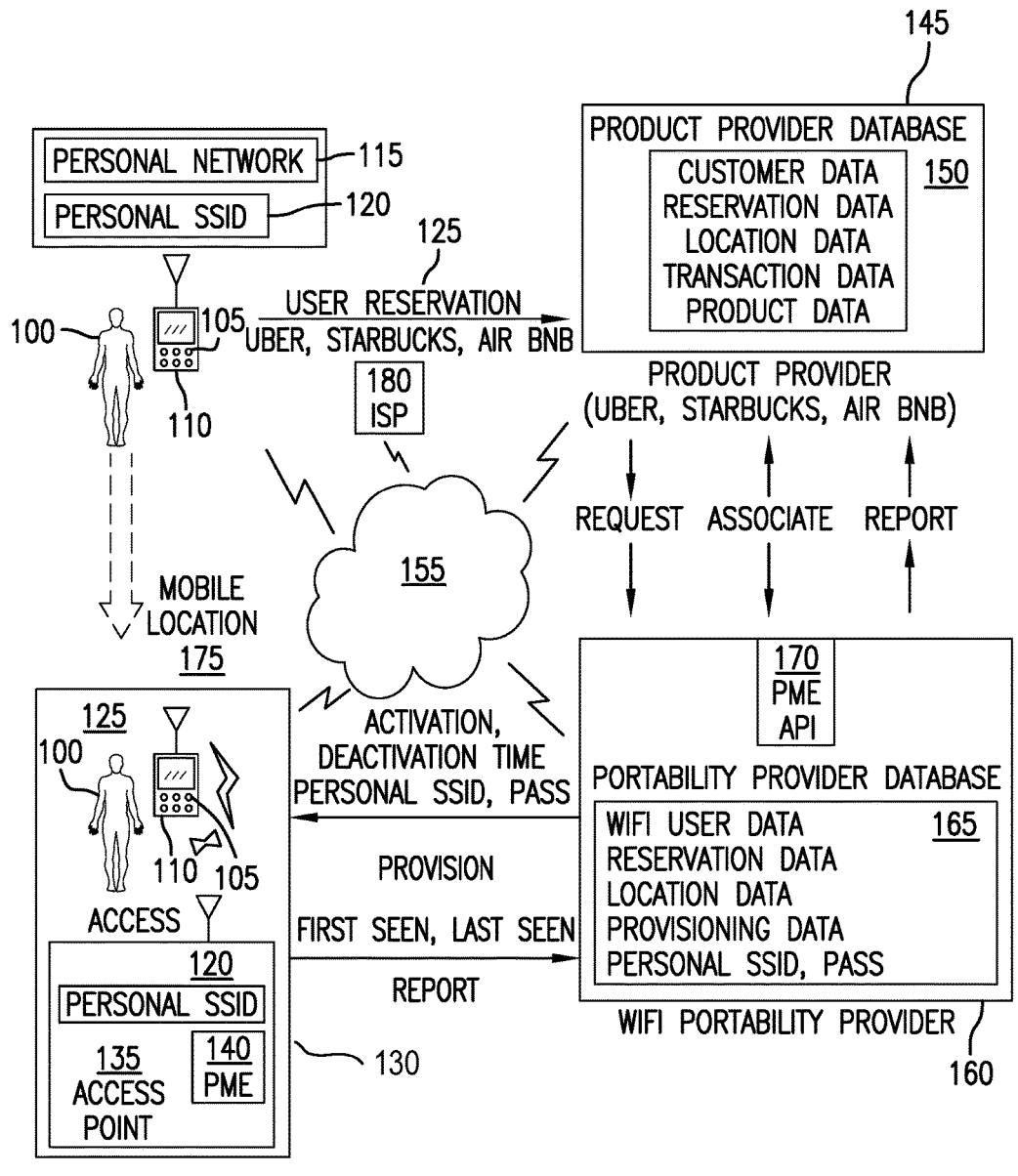
FIG. 1 depicts an exemplary collaboration network configuring a remote Wi-Fi access point with parameters governing the user's personal network, in response to user activity.

FIG. 1 depicts an exemplary collaboration network configuring a remote Wi-Fi access point with parameters governing the user's personal network, in response to user activity. In FIG. 1, a user 100 of an exemplary mobile application 105 hosted on an exemplary mobile device 110 is using an exemplary personal network 115 to access the Internet. In an illustrative example, the personal network 115 of user 100 is governed by the personal SSID 120 of user 100. In an exemplary embodiment, the user 100 makes a reservation 125 with a restaurant. The restaurant is served by an exemplary Wi-Fi network 130 remote from the personal network 115 of user 100. In some embodiments, the Wi-Fi network 130 is enabled by a Wi-Fi access point 135. The user 100 arrives at the restaurant at the time of the reservation 125. In an illustrative example, portable Internet access is provisioned for the user 100 during the reservation 125 by configuring the Wi-Fi access point 135 with parameters governing the user's personal network 115, in response to the user's reservation 125, and at a location and time based on the reservation 125. In an illustrative example, the Wi-Fi access point 135 is configured with the personal SSID 120 of user 100. In some embodiments, the personal SSID 120 of user 100 is already configured on mobile device 110 or mobile application 105, so that the user 100 can seamlessly and securely access the Internet via the remote network 130 during the reservation 125.

In some examples, the Wi-Fi access point 135 is configured by a Portability Management Engine 140 to activate the user's personal SSID 120 in Wi-Fi access point 135. In various embodiments, the Portability Management Engine 140 configures the Wi-Fi access point 135 to activate the personal SSID 120 of user 100 at a time based on the reservation 125. In some embodiments, the Portability Management Engine 140 configures the Wi-Fi access point 135 to deactivate the personal SSID 120 of user 100 at a time based on the reservation 125. In an illustrative example, a Product Provider 145 confirms the reservation 125 of user 100 in a Product Provider Database 150. In various implementations, the Product Provider Database 150 includes customer profiles, reservation data, product information, and locations where reservations or products may be offered by the Product Provider 145. In an illustrative example, the product provider 150 communicates via a network cloud 155 with a Portability Provider 160. In various embodiments, the network cloud 155 may be the Internet. In some implementations, the network cloud 155 may be a private network. In some examples, the network cloud may be a Virtual Private Network (VPN).

In an illustrative example, the Portability Provider 160 may determine an available Wi-Fi portability location and time to activate Wi-Fi portability for user 100 by associating information in the Portability Provider Database 165 with data from the Product Provider Database 150. In various implementations, the Portability Provider Database 160 includes Wi-Fi user data, reservation data, available locations and times for Wi-Fi portability service, and personal network parameters of users registered for portability service. In some designs, provisioning information in the Portability Provider Database 160 may include the allocation of times and locations of Wi-Fi access points either available to be configured or already configured for Wi-Fi portability. In some embodiments, the Portability Provider 160 may receive a request for Wi-Fi portability service to the user 100 from the Product Provider 145 via the network cloud 155 through a Portability Management Engine Application Programming Interface (PME API) 170. In various implementations, the PME API 170 may provide management access to the features and functions of access point 135. In some embodiments, the Portability Provider 160 may manage multiple access points at different locations. In various designs, the PME API 170 may be hosted as a system service on access point 135. In other embodiments, the PME API 170 may be implemented as a cloud service.

In some examples, the request received through the PME API 170 by the Portability Provider 160 for Wi-Fi portability service to user 100 may include customer profile data, reservation information, and the location and time of the reservation 125 for the user 100. In an illustrative example, the Portability Provider 160 may associate the requested location and time of the reservation 125 for the user 100 with the available locations and times for Wi-Fi portability service, to determine a location and time at which Wi-Fi portability service can be provided for user 100. In some implementations, upon a determination by the Portability Provider 160 that Wi-Fi portability service can be provided for user 100 at the location and time of the reservation 125, the Portability Provider 160 associates the customer profile data of user 100 received from the Product Provider 160 through the PME API 170 with personal network parameters of users registered for portability service. In various embodiments, upon a determination by the Portability Provider 160 that the user 100 is registered for Wi-Fi portability service, the Portability Provider 160 configures the access point 135 with the personal network parameters, including personal SSID 120, of user 100 at the provisioned location and time 175 to activate Wi-Fi portability service for user 100. In some designs, the Portability Provider 160 may request the personal network parameters of the user 100 from an Internet Service Provider (ISP) 180 already associated to user 100.

In some implementations, the access point 135 may be configured by Portability Provider 160 to monitor for the presence or activity of one or more device identifier. In various implementations the access point 135 may report to Portability Provider 160 the times or locations monitored devices are active. In an illustrative example, the reports of the times or locations monitored devices are active may include the time a device was first seen and the time a device was last seen by access point 135. In other examples, the access point 135 may report to Portability Provider 160 the times or locations previously unknown devices are active. In some examples, the Portability Provider 160 may share through the PME API 170 reports of device activity with the Product Provider 145. In other implementations, the Portability Provider 160 may collect statistics of network usage by user 100 from the access point 135. In various designs, the Portability Provider 160 may share through the PME API 170 collected statistics of network usage by user 100. In other implementations, the Product Provider 145 may request statistics of network usage by user 100 from the Portability Provider 160 through the PME API 170. In various examples, the Product Provider 145 may request device activity reports, including the time a device was first seen and the time a device was last seen by access point 135, from the Portability Provider 160 through the PME API 170.

In an illustrative example, a friend of the user 100 may visit the location served by the personal network of the user 100. In some designs, the access point 135 may report the friend's previously unknown wireless device identifier to the Portability Provider 160. In various embodiments, the Portability Provider 160 may configure the access point 135 to deploy the friend's personalized Wi-Fi SSID, avoiding the inconvenience of asking for the personal network parameters of user 100. In some designs, the Portability Provider 160 may offer, by text message or other real-time communication, Wi-Fi portability service to the friend of user 100. In some examples, upon acceptance of Wi-Fi portability service by the friend of user 100, the friend may download the appropriate portability app and register for Wi-Fi portability service deployed to the personal network of the user 100.

In various embodiments, the Product Provider 145 may employ the time a wireless device was first seen to improve customer service experience. For example, the Product Provider 145 may be a Hotel or a table in a restaurant, such as an Open Table location, at which the Wi-Fi access point 135 is located. In an illustrative example, the access point 135 at the Hotel Front Desk or Open Table location may be configured by a Portability Management Engine 140 to monitor for the presence of a wireless device identifier associated to the user 100. In some designs, the Product Provider 145 may determine an accurate waiting time of the user 100 at the Front Desk or restaurant table as a function of the first seen time of a wireless device identifier associated to the user 100 and the location id of the access point 135. For example, in some embodiments, the Portability Management Engine 140 may record and report the first seen time to the Product Provider 145, and the Hotel Front Desk or Open Table location operator conducting the check-in of the user 100 may record a Check-in Time Stamp. By comparing the first seen time recorded by the Portability Management Engine 140 and the Check-in Time Stamp recorded by the Hotel Front Desk or Open Table Operator, the company may calculate a more accurate waiting time for the check-in of user 100. In some examples, the company may use the more accurate waiting time to improve customer service while the user 100 waits to check-in. In some designs, the Product Provider 145 may configure the access point 135 with the personal network parameters, including personal SSID 120, of user 100 to activate Wi-Fi portability service for user 100 at the Hotel Front Desk or Open Table location. In an illustrative example, the Product Provider 145 may use the Wi-Fi portability service provided to the user 100 at the Hotel Front Desk or Open Table location to communicate product offers, discounts, messages, news, or notifications relevant to the relationship of the user 100 to one or more Product Provider 145. In various examples, the Product Provider 145 may customize the product offers, discounts, messages, news, or notifications communicated to the user 100 to keep the user 100 busy while waiting for check-in. In some designs, the Product Provider 145 may collect and share with Wi-Fi Portability Providers the first seen, last seen, and location id associated to various wireless devices and users. In some examples, the Product Provider 145 may statistically evaluate the collected first seen, last seen, and location id data to facilitate improvements to customer service, logistics, and process flows.

In some designs the Product Provider 145 may operate a mobile location containing one or more access point 135. For example, in various embodiments, the Product Provider 145 may be a ride sharing service. In various situations, a driver in a ride sharing service may refuse a potential passenger if the rider carries luggage. In other situations, a driver in a ride sharing service may refuse potential passengers with luggage in favor of taking on additional passengers without luggage. In some scenarios, the ride sharing service may have no ability to determine when potential riders who may be actively requesting a ride, are refused by a driver. Although in some situations the ride sharing service may deploy GPS-enabled mobile applications to the devices of potential riders, the GPS location data may not be accurate to the very close range needed to determine if a driver with available rider capacity passed near enough to a potential rider without engaging the potential rider. In various designs, the Product Provider 145 may deploy one or more access point 135 to one or more mobile unit of a ride sharing service. In some examples, the Product Provider 145 may be a ride sharing service such as Uber. In various examples, the ride sharing service or Product Provider 145 may configure one or more access point 135 via the Portability Management Engine 140 to monitor for the presence of one or more wireless device identifier. In some embodiments, the Product Provider 145 may be a car rental company. In some designs, the Product Provider 145 or car rental company may configure one or more access point 135 via the Portability Management Engine 140 to collect and report statistics on how much time users are riding in the car, compared to the distance driven. In some designs, the Product Provider 145 or car rental company may configure one or more access point 135 via the Portability Management Engine 140 to collect and report statistics on how many devices are connected and the number of users traveling in the car. In other designs, the ride sharing service or Product Provider 145 may configure one or more access point 135 via the Portability Management Engine 140 to monitor for and report the presence of one or more previously unknown wireless device identifier. In some designs, the ride sharing service may collect and share with Wi-Fi Portability Providers the first seen, last seen, and location id associated to various wireless devices and users. In some embodiments, the ride sharing service may configure the one or more access point 135 with the personal network parameters, including personal SSID 120 of user 100 to activate Wi-Fi portability service for user 100 in the mobile unit of the ride sharing service. In some designs, a car sharing service may configure the one or more access point 135 to determine if too many devices are connected to one account, which may indicate a renter has shared the Wi-Fi parameters or rental code to many people. In an illustrative example, activating the personal SSID 120 of user 100 in the mobile unit of the Product Provider 145 or ride sharing service may confirm the proximity of the ride sharing service driver to the potential rider. In some designs, the Product Provider 145 or ride sharing service may determine the proximity of the ride sharing service driver to the potential rider as a function of the first seen, last seen, and location id.

In some designs the Product Provider 145 may operate a mobile location containing one or more access point 135. For example, in various embodiments, the Product Provider 145 may be a transportation operator of a transportation vehicle such as a train, subway, or bus. In various situations, trains, subway cars, or buses may be delayed. In some scenarios, the transportation operator or Product Provider 145 may not have the ability to determine that some passengers did not ride for the complete trip corresponding to the purchased ticket. In other scenarios, some passengers may ride longer than the expected time of the trip corresponding to the ticket purchased. In various scenarios, the transportation operator or Product Provider 145 may deploy one or more access point 135 to one or more mobile unit of a transportation vehicle. In various examples, the transportation operator or Product Provider 145 may configure one or more access point 135 via the Portability Management Engine 140 to monitor for the presence of one or more wireless device identifier. In other designs, the transportation operator or Product Provider 145 may configure one or more access point 135 via the Portability Management Engine 140 to monitor for and report the presence of one or more previously unknown wireless device identifier. In some designs, the transportation operator or Product Provider 145 may collect and share with Wi-Fi Portability Providers the first seen, last seen, and location id associated to various wireless devices and users. In various examples, the transportation operator or Product Provider 145 may identify and track passengers who purchase a ticket for one city, and remain in the train to continue to a different city, based on collecting and sharing with Wi-Fi Portability Providers the first seen, last seen, and location id associated to various wireless devices and users. In some embodiments, the transportation operator or Product Provider 145 may configure the one or more access point 135 with the personal network parameters, including personal SSID 120 of user 100 to activate Wi-Fi portability service for user 100 in the mobile unit of the transportation vehicle. In an illustrative example, activating the personal SSID 120 of user 100 or monitoring for and reporting the presence of one or more wireless device identifier in the mobile unit of the transportation vehicle may confirm the location of a passenger within the vehicle. In some designs, the transportation operator or Product Provider 145 may determine the passenger's location within the vehicle, and arrival or departure times, to a specific train car, or a specific seat within a train or bus. In some examples, the transportation operator or Product Provider 145 may track passengers as the passengers move from seat to seat or car to car within the transportation vehicle as a function of the first seen, last seen, and location id reported by access point 135. In various embodiments, the transportation operator or Product Provider 145 may calculate and compare first seen and last seen averages with the reservation expected time of service to understand if the customer rides longer than usual. In some designs, the transportation operator or Product Provider 145 may determine which customers were delayed, as a function of first seen, last seen, and location id reported by access point 135. In some examples, the transportation operator or Product Provider 145 may reimburse or compensate delayed customers based on determining which customers were delayed, as a function of first seen, last seen, and location id reported by access point 135. In some examples, access point 135 may localize wireless access to a train car. In some designs, more than one access point 135 may be configured to use radio direction finding antennas and techniques, such as beam forming, to determine the location of a wireless device to the seat level. In various scenarios, maintenance or safety problems may negatively impact the customer experience in one or more areas localized to only a portion of a transportation vehicle. In some embodiments, the transportation operator or Product Provider 145 may detect maintenance or safety problems localized to a specific region within a train car or bus by determining, based on the location of a wireless device within the train or bus, when passengers move away from the passenger's designated seat. For example, if a broken window of a train or bus causes customers to be soaked by rain, the train car or seats having the broken window will likely be empty of passengers. In some designs, the transportation operator or Product Provider 145 may report to company headquarters the potential problems indicated by unexpectedly empty vehicle areas, determined based on wireless device location reported by access point 135.

Figure 2:
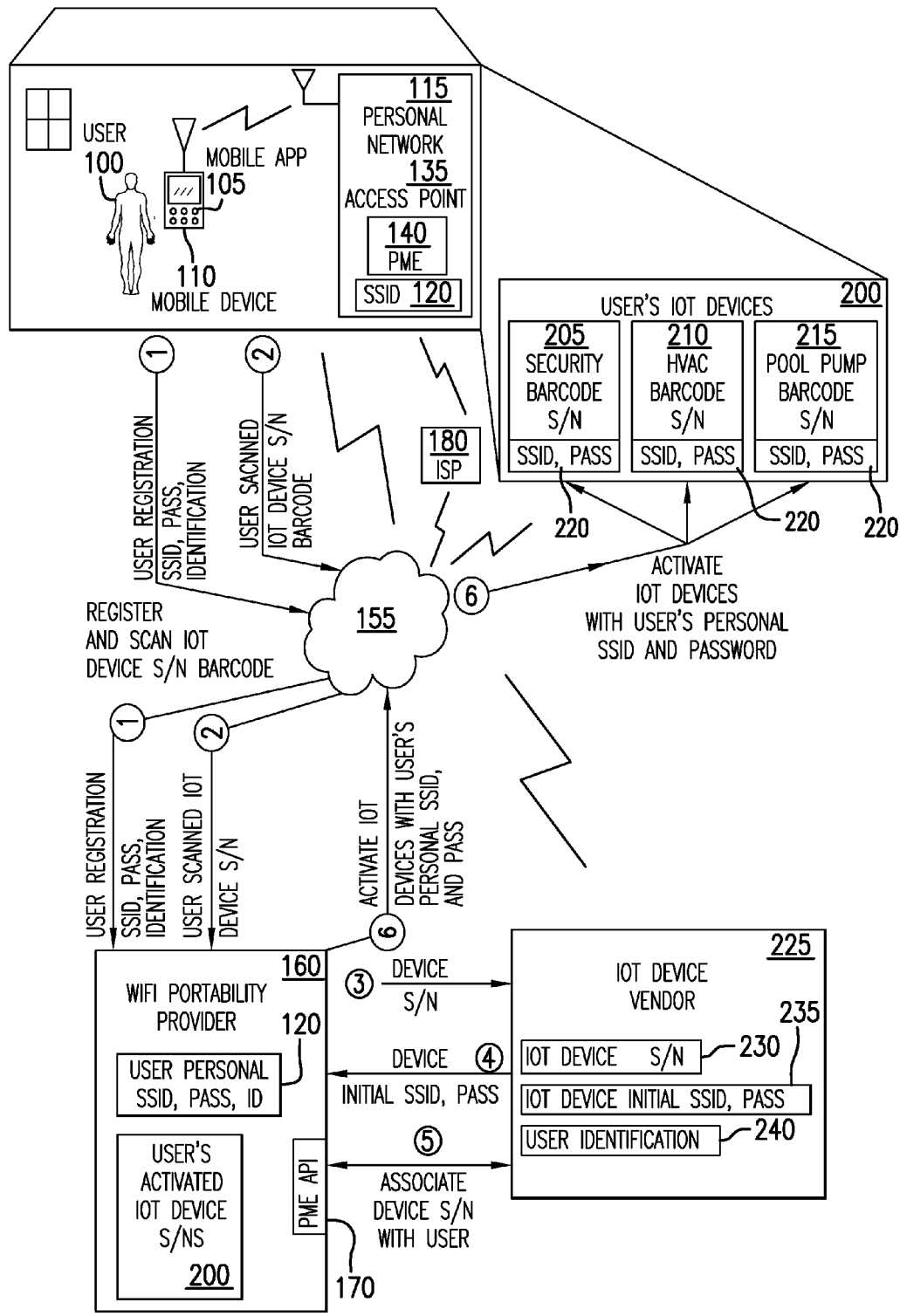
FIG. 2 depicts an exemplary collaboration network configuring an Internet of Things (IoT) device with parameters governing the user's personal network, in response to user activity.

FIG. 2 depicts an exemplary collaboration network configuring an Internet of Things (IoT) device with parameters governing the user's personal network, in response to user activity. In FIG. 2, in an illustrative example, the user 100 has purchased IoT devices 200 and the user 100 is configuring the IoT devices 200 for access to the Internet through the personal network 115 of user 100. In some embodiments, the user 100 may employ mobile application 105 hosted on mobile device 110 to configure IoT devices 200 with parameters 120 governing the personal network of user 100. In an illustrative example, the user's IoT devices 200 may include a security system 205, HVAC 210, and pool pump 215. In some designs, each IoT device may have a barcode label displaying the IoT device serial number. In various implementations, the user 100 may employ mobile application 105 to scan the barcode serial number label of one of the IoT devices 200. In some designs, the mobile application 105 may send the serial number of one of the IoT devices 200 to the Portability Provider 160. In some examples, each IoT device 205, 210, and 215 may be factory configured with network parameters 220 governing access to the IoT device by IoT device vendor 225. In various embodiments, if the IoT device identified with the scanned serial number barcode has not been activated on the personal network 115 of user 100, the Portability Provider 160 may collaborate with an IoT device vendor 225 to configure the IoT device with parameters 120 governing the personal network of user 100. In various examples, the Portability Provider 160 may present to the IoT device vendor 225 the serial number of the IoT device with information certifying the ownership of the IoT device by user 100. In some designs, after confirming the IoT device ownership, the IoT device vendor 225 may configure the IoT device to accept configuration of network parameters 120 governing the personal network of user 100. In various embodiments, the configuration of the IoT device to operate with network parameters 120 governing the personal network of user 100 may be completed without exposing the network parameters 120 to the IoT device vendor 225.

In some examples, each IoT device, the IoT device vendor, and the mobile device 110 of user 100 may be equipped with one or more Broadband Wireless Access (BWA) network. In some designs, communication with one or more IoT device may be through a secure tunnel, such as through SSH. In various implementations the user 100 may collaborate with Portability Provider 160 and the IoT device vendor 225 to configure each IoT device 205, 210, and 215 with parameters governing the personal network 115 of user 100. In an illustrative example, the user 100 may employ mobile application 105 hosted on mobile device 110 to collaborate with Portability Provider 160 and the IoT device vendor 225 to configure each IoT device 205, 210, and 215 with parameters governing the personal network 115 of user 100. In some embodiments, the IoT device vendor 225 retains IoT device inventory information for IoT devices, including the serial number 230 and the initial network parameters 235 of each IoT device. In various examples, the IoT device vendor stores IoT device user identification information 240 identifying the owner of each device. In some designs, the Wi-Fi Portability Provider 160 may retain the serial numbers of the IoT devices activated with the network parameters 120 governing the personal network of user 100. In some examples, the IoT device vendor 225 may update the user identification information 240 when ownership of an IoT device changes. In other examples, the IoT device ownership recorded in user identification information 240 may be updated by the IoT device vendor 225 in collaboration with a retail or credit card provider when an IoT device is sold. In various embodiments, the IoT device vendor may store a cryptographically secure certification of the IoT device ownership recorded in user identification information 240. In some designs, the cryptographically secure certification of the IoT device ownership recorded in user identification information 240 may be used in collaboration with a Wi-Fi Portability Provider to confirm the identity of a new owner of an IoT device.

In an illustrative example, the user 100 may register for IoT portability service with Wi-Fi Portability Provider 160 by providing network parameters 120 governing the personal network 115 of user 100 to the Wi-Fi Portability Provider 160. In some examples, the user 100 may supply information identifying the user 100 to the Wi-Fi Portability Provider 160. In various embodiments, the user 100 may scan the barcode serial number label of one of the IoT devices 200 with the mobile application 105 to invoke configuration of the IoT device with the network parameters 120 governing access to the personal network 115 of user 100. In some embodiments, the mobile application 105 may send the IoT device serial number scanned by user 100 to the Wi-Fi Portability Provider 160. In various implementations, the Wi-Fi Portability Provider 160 may determine, by comparing serial numbers, if the IoT device serial number received from the mobile application 105 has been configured with the network parameters 120 governing access to the personal network 115 of user 100. In some embodiments, upon a determination by the Wi-Fi Portability Provider 160 that the IoT device serial number received from the mobile application 105 has not been configured with the network parameters 120 governing access to the personal network 115 of user 100, the Wi-Fi Portability Provider 160 may send the IoT device serial number to the IoT device vendor 225. In some designs, the Wi-Fi Portability Provider 160 may send with the IoT device serial number to the IoT device vendor 225 a cryptographically secure certification of the IoT device ownership. In various implementations, the IoT device vendor 225 may determine the assertion of IoT device ownership by the Wi-Fi Portability Provider 160 on behalf of the user 100 is valid based on the cryptographically secure certification of ownership, the user identification information, and one or more security protocols, such as PGP. In various designs, one or more of the Wi-Fi Portability Provider 160, IoT device vendor 225, user 100, mobile app 105, or mobile device 110 may sign the cryptographically secure certification of ownership, indicating a trust relationship.

In some implementations, upon a determination by IoT device vendor 225 that the assertion of IoT device ownership by the Wi-Fi Portability Provider 160 on behalf of the user 100 is valid, the IoT device vendor may release control of the IoT device to the user 100 through the Wi-Fi Portability Provider 160. In some embodiments, the IoT device vendor may store the cryptographically signed secure certification of trust in the Wi-Fi Portability Provider 160 in the IoT device. In various designs, the IoT device vendor 225 may send to the Wi-Fi Portability Provider 160 the network parameters 220 governing access to the IoT device by IoT device vendor 225. In some embodiments, the IoT device vendor may also send, to the Wi-Fi Portability Provider 160, with the IoT device vendor 225 network parameters 220, the cryptographically signed secure certification of trust in the Wi-Fi Portability Provider 160. In an illustrative example, the IoT device vendor 225 may configure the IoT device to reconfigure the network parameters of the IoT device upon a subsequent connection to a network governed by the current IoT device vendor 225 network parameters 220.

In various examples, the Wi-Fi Portability Provider 160 may direct the Portability Management Engine 140 to activate in access point 135 a network governed by the current IoT device vendor 225 network parameters 220. In some examples, the network activated in access point 135 and governed by the current IoT device vendor 225 network parameters 220 may be used to complete the configuration of the IoT device with the network parameters 120 governing access to the personal network 115 of user 100. In some designs, the Wi-Fi Portability Provider 160 may direct the Portability Management Engine 140 hosted on access point 135 to activate, on the network governed by the current IoT device vendor 225 network parameters 220, an authenticated configuration service hosted on access point 135. In various implementations, and in collaboration with the IoT device configured to accept new network parameters 220 upon a subsequent connection, the authenticated configuration service may reconfigure the IoT device network parameters 220 with the network parameters 120 governing access to the personal network 115 of user 100.

In an illustrative example, the IoT device vendor 225 may disconnect from the IoT device and the IoT device may reconnect to the network activated in access point 135 governed by the current IoT device vendor 225 network parameters 220. In some designs, upon connection to the network activated in access point 135 and governed by the current IoT device vendor 225 network parameters 220, the Portability Management Engine 140 hosted on access point 135 may present to the IoT device the network parameters 120 governing access to the personal network 115 of user 100, with the cryptographically signed secure certification of trust in the Wi-Fi Portability Provider 160. In various embodiments, upon a determination by the IoT device that the cryptographically signed secure certification of trust in the Wi-Fi Portability Provider 160 is valid, the IoT device may configure the IoT device network parameters to match the network parameters 120 governing access to the personal network 115 of user 100. In some implementations, the IoT device may disconnect from the network activated in access point 135 to configure the IoT device on the personal network 115 of user 100. In some designs, the Portability Management Engine 140 may deactivate the network activated in access point 135 to configure the IoT device on the personal network 115 of user 100. In various implementations, the IoT device may reconnect using the network parameters 120 governing access to the personal network 115 of user 100. In various designs, the Portability Provider 160 may add the activated IoT device serial number to IoT devices 200 of user 100. In some examples, the IoT device vendor 225 may update the cryptographically secure certification of the IoT device ownership recorded in user identification information 240 with reference to the IoT device serial number, to record the transfer of control of the IoT device.

Figure 3A:
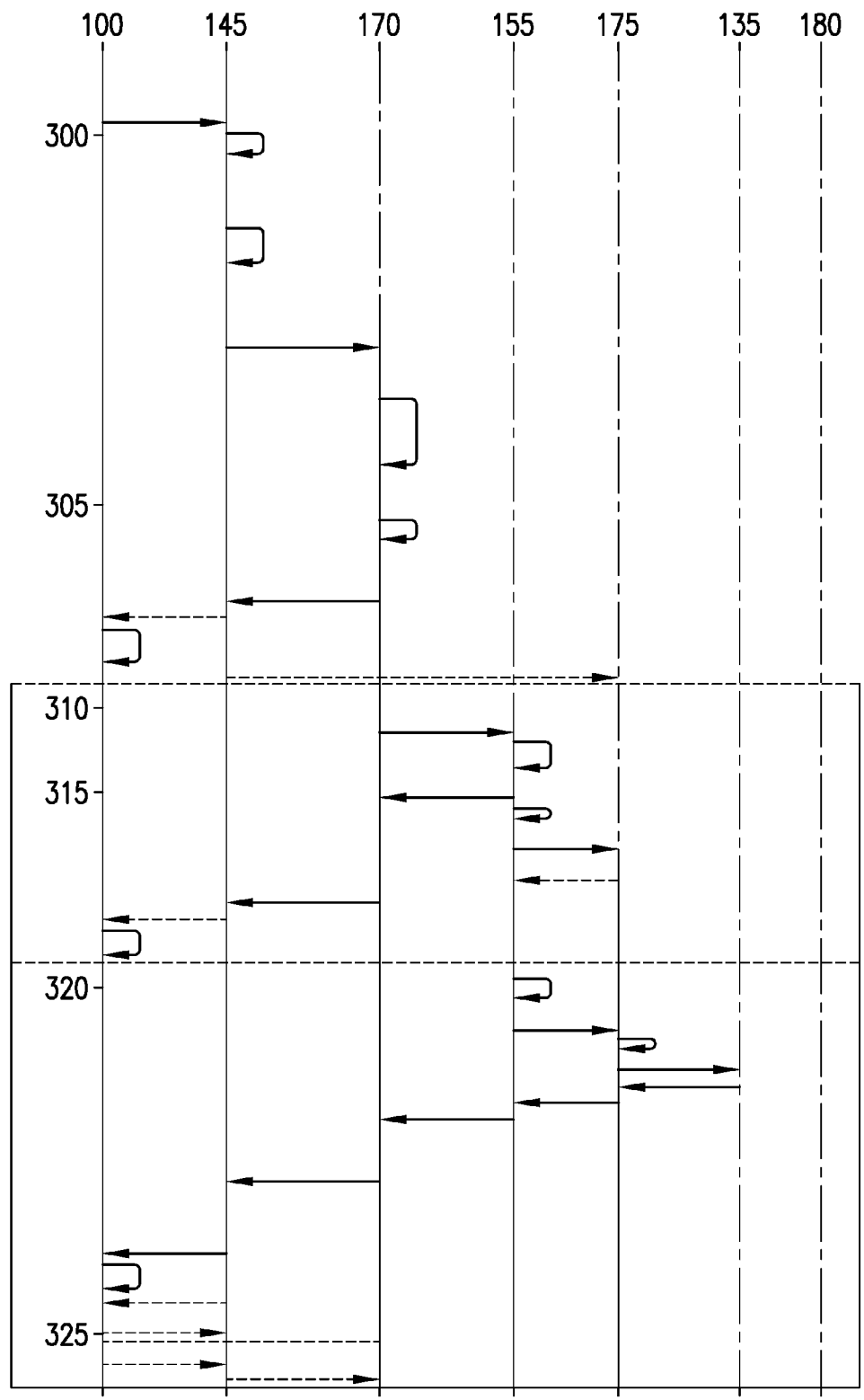
FIGS. 3A-3B depict communication, from a user perspective, by an exemplary collaboration network configuring a remote Wi-Fi access point with parameters governing the user's personal network, in response to user activity.
Figure 3B:
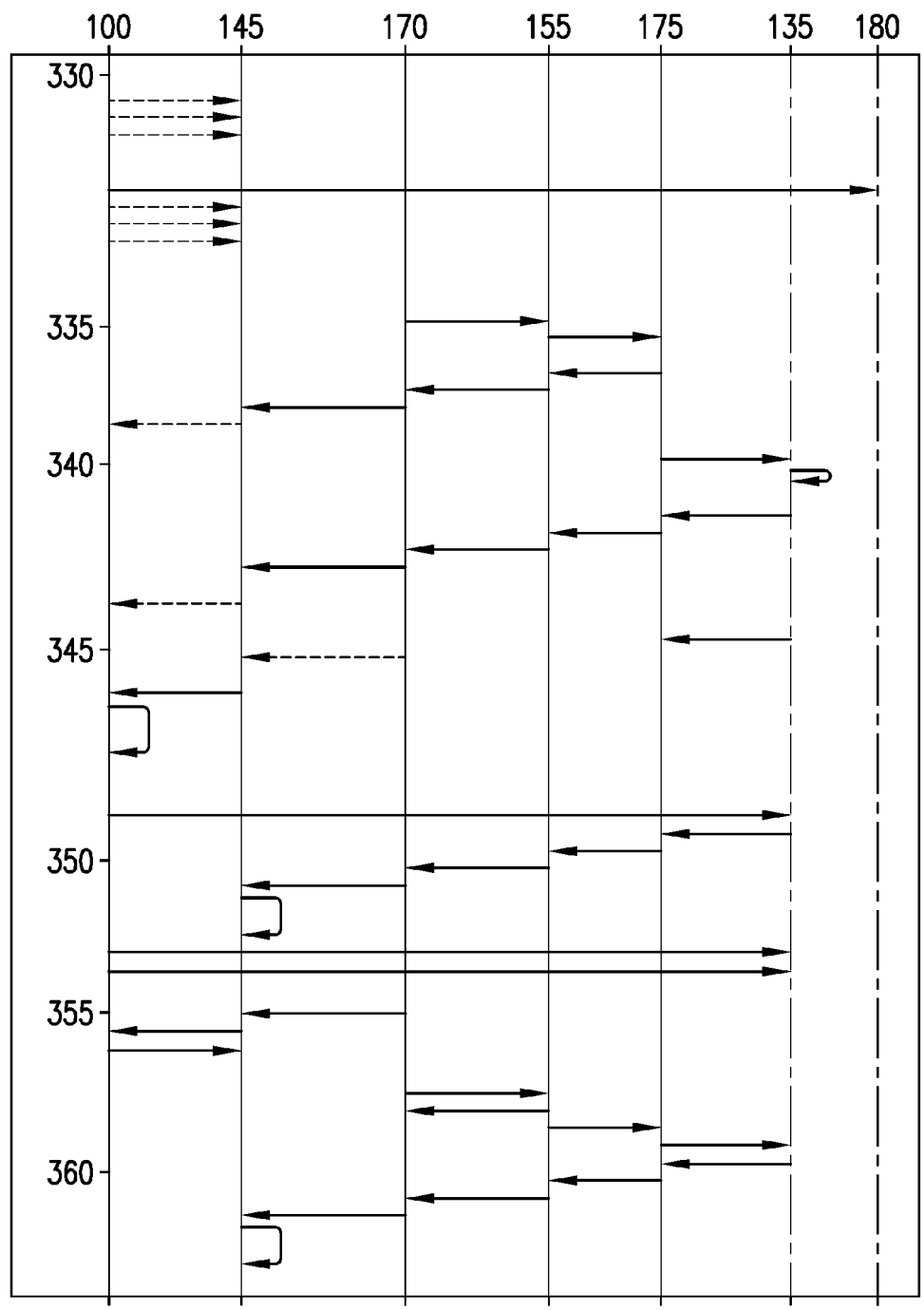

FIGS. 3A-3B depict communication, from a user perspective, by an exemplary collaboration network configuring a remote Wi-Fi access point with parameters governing the user's personal network, in response to user activity. In FIG. 3A, in an illustrative example, various exemplary messaging scenarios directed to configuring a remote Wi-Fi access point with parameters governing the user's personal network, in response to user activity, are shown. In an illustrative example, at scenario 300, the user 100 initiates a transaction with the Product Provider 145. In various examples, the transaction may be a purchase, a reservation, or a check-in without a reservation. In some embodiments, the user 100 may present information identifying the relationship of the user 100 to the Product Provider 145 with the transaction. In some examples, the identifying information may be a login, membership card, rewards card, payment card, identification card, or a coupon to be redeemed. In various embodiments, the Product Provider 145 may accept the transaction from the user 100 and create a reservation or purchase, or process the check-in by the user 100. In some examples, the Product Provider 145 may request, through the PME API 170, Wi-Fi portability from a Wi-Fi Portability Provider at a location or time related to the transaction by user 100. In various designs, the Product Provider 145 may send various information to the Portability Provider with the request, including the service or product provider identification, information identifying the transaction by the user 100, information identifying the user 100, the number of users for which service is being requested, details of the location related to the transaction by user 100, and time windows based on the transaction, for providing Wi-Fi portability to user 100. In an illustrative example the details of the location related to the transaction by user 100 may include a street address, coordinates, or information identifying one or more door, transit gate, floor, or building. In some implementations, the Wi-Fi Portability Provider may receive the request through the PME API 170. In some embodiments, based on the information sent by the Product Provider with the request, the Wi-Fi Portability Provider may search for available Wi-Fi portability at a location related to the transaction by the user 100. In an illustrative example, at scenario 305, if the Wi-Fi Portability Provider determines Wi-Fi portability is not available at a location related to the transaction by the user 100, the Wi-Fi Portability Provider may notify the Product Provider 145 through the PME API 170 that an opportunity to provide Wi-Fi portability service was missed due to lack of an available access point. In various embodiments, the Wi-Fi Portability Provider may notify the Product Provider 145 through the PME API 170 of the reason the opportunity to provide Wi-Fi portability service was missed.

In some examples, at scenario 310, if the Wi-Fi Portability Provider determines Wi-Fi portability is available at a location related to the transaction by the user 100, the Wi-Fi Portability Provider may further check for available SSID slots based on the location and available time windows for Wi-Fi portability at the location. In various embodiments, at scenario 315, if the Wi-Fi Portability Provider determines Wi-Fi portability is not available for the requested SSID slots at a location and time related to the transaction by the user 100, the Wi-Fi Portability Provider may notify the Product Provider 145 through the PME API 170 that an opportunity to provide Wi-Fi portability service was missed due to lack of an available SSID time slot. In some designs, the Wi-Fi Portability Provider may notify the Product Provider 145 through the PME API 170 of the reason the opportunity to provide Wi-Fi portability service was missed.

In some examples, at scenario 320, if the Wi-Fi Portability Provider determines Wi-Fi portability is available at a location and time related to the transaction by the user 100, and the requested SSID slots are also available, the Wi-Fi Portability Provider may further confirm the network is operational by testing connectivity to the network maintainer (not shown) through Internet cloud 155 for the available SSID slots at the requested location. In some embodiments, upon a determination by the Wi-Fi Portability Provider that the requested SSID slots are available at the location and time related to the transaction by the user 100, and if the network is operational, the Wi-Fi Portability Provider may provision the access point 135 to activate the requested SSID slots at the location and time 175 for Wi-Fi portability service for user 100. In various implementations, the access point 135 may confirm the activation of the SSID time slot to the Wi-Fi Portability Provider. In some designs, the Wi-Fi Portability Provider may notify the Product Provider 145 through the PME API 170 the requested SSID slot has been provisioned at the location and time 175 for Wi-Fi portability service for user 100. In some examples, the Product Provider 145 may notify the user 100 the requested Wi-Fi portability service has been activated. In various embodiments, if custom parameters were generated for the user 100 and provisioned in access point 135 for portability service to user 100, the Product Provider 145 may provide the user 100 with the custom parameters.

In some designs, at scenario 325, the user 100 may manage their Wi-Fi portability through the Product Provider 145. In various embodiments, the user 100 may establish default network parameters based on the relationship of the user to the Portability Provider. In other embodiments, the user 100 may choose custom network parameters. In various implementations, the Product Provider 145 may send the custom network parameters chosen by the user 100 to the Portability Provider to provision Wi-Fi portability service based on the custom parameters for user 100.

In FIG. 3B, in an illustrative example, various exemplary messaging scenarios directed to configuring a remote Wi-Fi access point with parameters governing the user's personal network, in response to user activity, are shown. In an illustrative example, at scenario 330, the user 100 may change network parameters including SSID, password or passphrase, and encryption type, through the Product Provider 145. In various implementations, the Product Provider 145 may send the network parameters changed by the user 100 to the Portability Provider to provision Wi-Fi portability service based on the changed parameters for user 100. In various embodiments, the user 100 or the Product Provider 145 may request the forgotten network parameters of the user 100 from the Internet Service Provider (ISP) 180 to which the user 100 subscribes. In an illustrative example, at scenario 335, the Wi-Fi Portability Provider may have received a request at PME API 170 to provision Wi-Fi portability service for the user 100. In some embodiments, the Wi-Fi Portability Provider may attempt to confirm the network at the requested location for portability service is operational by testing connectivity to the network maintainer (not shown) through Internet cloud 155 for the requested location. In some examples, upon a determination the network connectivity at the requested location is not acceptable, the Portability Provider may notify the Product Provider 145 of the temporary network failure through the PME API 170. In various examples, the Product Provider 145 may notify the user 100 the network at the requested location is unavailable. In an illustrative example, at scenario 340, the Wi-Fi Portability Provider may have received a request at PME API 170 to provision Wi-Fi portability service to the user 100. In some embodiments, the Wi-Fi Portability Provider may have confirmed the network at the requested location for portability service is operational. In various designs the Wi-Fi Portability Provider may have confirmed the requested SSID time slot is available at the location and time to be provisioned 175. In some examples, the Wi-Fi Portability Provider may further attempt to confirm the antenna at portability location 175 is operational by querying access point 135 for the status of the antenna. In some examples, upon a determination the antenna of access point 135 is not operational, the Portability Provider may notify the Product Provider 145 of the temporary network failure through the PME API 170. In various examples, the Product Provider 145 may notify the user 100 that the antenna at the requested location is unavailable. In some embodiments, at scenario 345, the Wi-Fi Portability Provider may have received a request at PME API 170 to provision Wi-Fi portability service for the user 100. In some embodiments, the Wi-Fi Portability Provider may have confirmed the network at the requested location for portability service is operational. In various designs the Wi-Fi Portability Provider may have confirmed the requested SSID time slot is available at the location and time to be provisioned 175. In some examples, the Wi-Fi Portability Provider may further attempt to confirm the antenna at portability location 175 is operational by querying access point 135 for the status of the antenna. In an illustrative example, an attempt by the Wi-Fi Portability Provider to confirm the antenna at portability location 175 is operational may include determining the status of additional operational characteristics or configuration of access point 135. In various implementations, additional operational characteristics or configuration of access point 135 may include the status or revision level of software services or hardware elements local to access point 135 or external to access point 135. For example, an operational status determination for antenna at portability location 175 may be based on the availability of security features, revision levels, or patch levels in access point 135. In some embodiments, the available security features, revision levels, or patch levels in access point 135 may be selectively matched to similar features stored in a user's profile. In an illustrative example, a user's profile may specify that the user will only consider portability locations with specific levels of security features. For example, a user may require acceptable portability locations to provide at least a certain type or revision level of encryption or authentication. In other examples, a user may require minimum revision or patch levels of certain software libraries or security protocols on access point 135. In some designs, upon a determination the antenna of access point 135 is operational, the Wi-Fi Portability Provider may provision the access point 135 to activate the requested SSID slots at the location and time 175 for Wi-Fi portability service to the user 100. In various implementations, the access point 135 may confirm the activation of the SSID time slot to the Wi-Fi Portability Provider. In some designs, the Wi-Fi Portability Provider may notify the Product Provider 145 through the PME API 170 that the requested SSID slot has been provisioned at the location and time 175 for Wi-Fi portability service to user 100. In some examples, the Product Provider 145 may notify the user 100 the requested Wi-Fi portability service has been activated. In various embodiments, if custom parameters were generated for the user 100 and provisioned in access point 135 for portability service to user 100, the Product Provider 145 may provide the user 100 with the custom parameters.

In various embodiments, at scenario 350, the Wi-Fi Portability Provider may have successfully provisioned the access point 135 to activate the requested SSID slots at the location and time 175 for Wi-Fi portability service to user 100. In various implementations, the access point 135 may monitor for device identifiers of active devices at the provisioned location and time 175. In some embodiments, the access point 135 may report the active device identifiers with the time each active device was first seen at the provisioned location and time 175. In various examples, reports of active device identifiers and first seen times may be sent by access point 135 through the Internet cloud 155 to the Portability Provider. In some examples, the reports of active device identifiers and first seen times, received by the Portability Provider, may be forwarded to the Product Provider 145 through the PME API 170.

In some examples, at scenario 355, the Wi-Fi Portability Provider may have successfully provisioned the access point 135 to activate the requested SSID slots at the provisioned location and time 175 for Wi-Fi portability service to user 100. In various implementations, the deactivation time may be impending for the provisioned location and time 175 for Wi-Fi portability service to user 100. In some examples, the Wi-Fi Portability Provider may notify the Product Provider 145 through the PME API 170 of the impending deactivation of Wi-Fi portability service to user 100. In various examples, the Product Provider may notify the user 100 that Wi-Fi portability service for the provisioned location and time will soon be deactivated. In various implementations, the Wi-Fi Portability provider may command the access point 135 to deactivate the requested SSID slots at the provisioned location and deactivation time 175 for Wi-Fi portability service to user 100. In some designs, the access point 135 may automatically deactivate the requested SSID slots at the provisioned location and deactivation time 175 for Wi-Fi portability service to user 100. In various embodiments, at scenario 360, the Wi-Fi Portability provider may have successfully deactivated the requested SSID slots at the provisioned location and deactivation time 175 for Wi-Fi portability service to user 100. In various implementations, the access point 135 may monitor for device identifiers of active devices at the provisioned location and time 175. In some embodiments, the access point 135 may report the active device identifiers with the time each active device was last seen at the provisioned location and time 175. In various examples, reports of active device identifiers and last seen times may be sent after deactivation by access point 135 through the Internet cloud 155 to the Portability Provider. In some examples, the reports of active device identifiers and last seen times, received by the Portability Provider, may be forwarded to the Product Provider 145 through the PME API 170.

Figure 4:
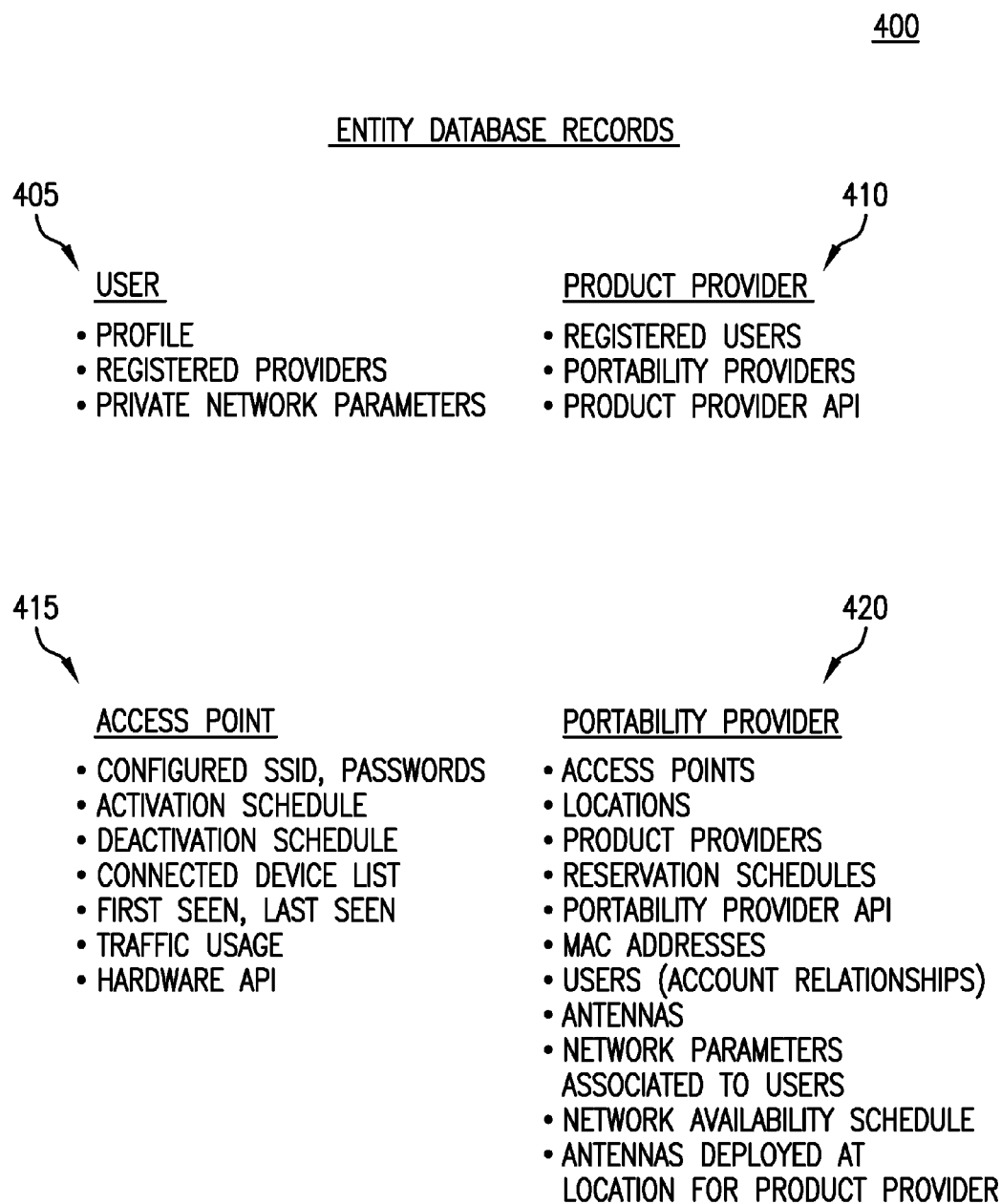
FIG. 4 depicts exemplary database records employed by an exemplary Portability Provider and Product Provider to configure a remote network with parameters governing a user's personal network, in response to the user's activity.

FIG. 4 depicts exemplary database records employed by an exemplary Portability Provider and Product Provider to configure a remote network with parameters governing a user's personal network, in response to the user's activity. In FIG. 4, exemplary database records are described, representing various data used by a Portability Provider and Product Provider to provide portability service to a user, including User Information records 405, Product Provider records 410, Access Point records 415, and Portability Provider records 420.

In an illustrative example, User Information records 405 may include User Profiles, Registered Providers, and Private Network Parameters. In some examples, User Profiles may include user identification, address, email, social media, phone number, payment information, and service or product history. In various examples, Registered Provider records may include the identities, contact methods, network locations, and service capabilities of portability providers and product providers to which a user is subscribed. In other examples, Private Network Parameters may include encryption type, SSID, and password, for a user's personal network.

In various embodiments, Product Provider records 410 may include Registered Users, Portability Providers, and database support for a Product Provider API. In some examples, Registered Users may include identification and profile information for users known to the Product Provider. In other examples, Portability Providers records may include identities, contact methods, network locations, and service capabilities of portability providers to which the product provider is subscribed. In various implementations, the Product Provider API records may include database support for transaction processing, order history, pricing, and customer statistics.

In other embodiments, Access Point records 415 may include Configured SSID and password records for the activated Wi-Fi networks in the access point. In various designs, the Access Point Records 415 may also include Activation Schedule records and Deactivation Schedule records representing the time windows for activation and deactivation of portable Wi-Fi networks in the access point. In some designs, the Access Point Records 415 may also include Connected Device List records representing the device identifiers of active devices at locations and times of portable Wi-Fi service. In addition, the Access Point Records 415 may include further device statistics records including the times when devices are active, represented in First Seen and Last Seen records, and Traffic Usage records, representing the network usage of devices provided with Wi-Fi portability service.

Figure 5A:
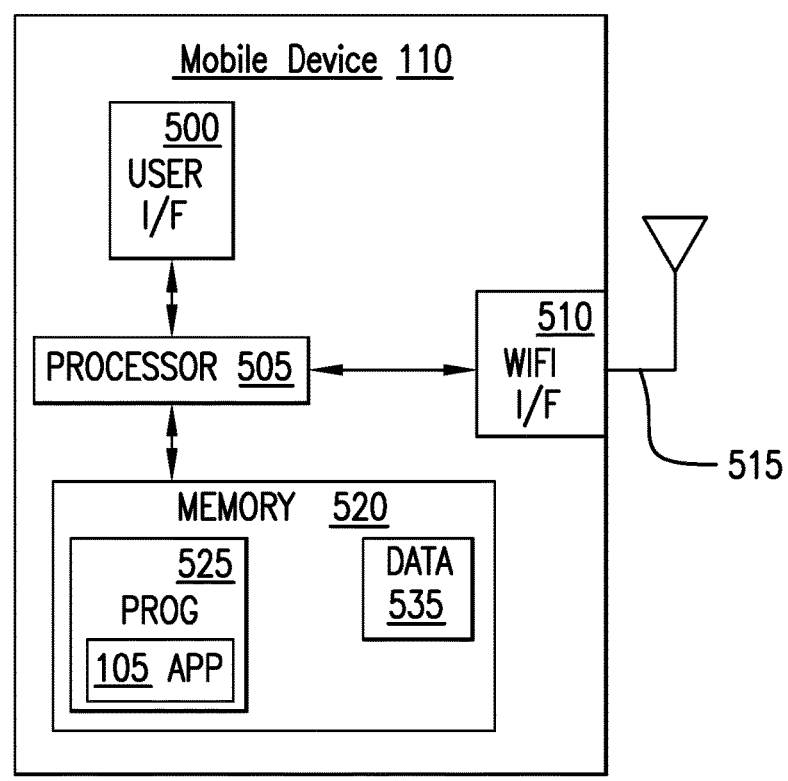
FIGS. 5A-5D depict various views of the structure of an exemplary mobile device and an exemplary mobile application user interface.
Figure 5B:
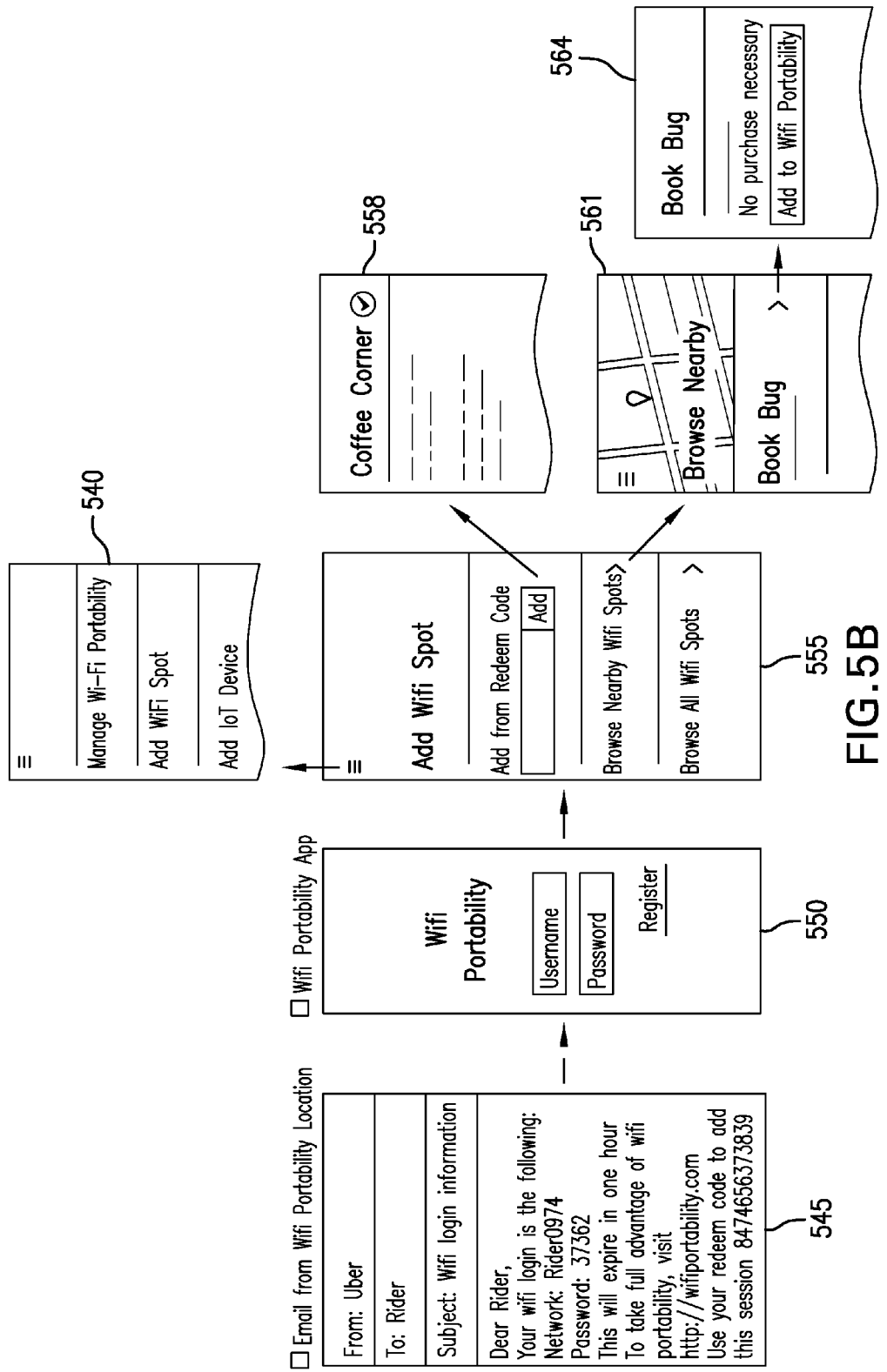

In some examples, Portability Provider records 420 may include:
  i. Access Points: A list of access points controlled by the Portability Provider, identified by an identifier that is unique in the Portability Provider's network, for example, a location id
  ii. Locations: A list of locations served by the Portability Providers access points; the locations are places where portable Wi-Fi service may be offered by the Portability Provider
  iii. Product Providers: A list of Product Providers the Portability Provider has relationships with, including contact methods, API information, and access methods for each Product Provider
  iv. Reservation Schedules: Lists of times and locations at which the Portability Provider has provisioned access points to activate Wi-Fi portability service
  v. Portability Provider API: the database record support for the primary interface used by Product Providers may include user usage statistics, first seen and last seen, previously unknown devices, user information
  vi. MAC Addresses: All of the MAC Addresses (or other wireless device identifier) detected by the Portability Provider's access points, stored with first seen, last seen, and activity times. A wireless device identifier may include: MAC Address (to identify a Wireless Ethernet interface); Bluetooth Device Address (to identify a Bluetooth interface); Universally Unique Identifier (UUID) (to identify any device or entity including a Bluetooth interface); or a Mobile Equipment Identifier (MEID) (to identify any device including a Broadband Wireless Access device).
  vii. Users (Account relationship): Lists of all users with the Product Provider and Portability Provider account information for each user
  viii. Antennas: Lists of available antennas and status for each antenna; may also include the available capacity of each antenna for additional network provisioning
  ix. Network Parameters Associated to Users: Lists of all registered users and each user's personal network parameters
  x. Network Availability Schedule: Lists of time windows available for Wi-Fi portability at each access point location
  xi. Antennas Deployed at Location for Product Provider: Lists of all antennas and access points deployed at Product Provider locations for management by the Product Provider FIGS. 5A-5D depict various views of the structure of an exemplary mobile device and an exemplary mobile application user interface. In FIG. 5A, a block diagram of an exemplary mobile device 110 includes a user interface 500 that is operatively coupled with a processor 505. The processor 505 is communicatively coupled with Wi-Fi interface 510. Wi-Fi interface 510 is configured to communicate with a network via antenna 515. The processor 505 is in electrical communication with memory 520. The depicted memory 520 includes program memory 525 and data memory 535. The program memory 525 includes processor-executable program instructions implementing mobile application 105. In FIG. 5B, a screenshot of an exemplary mobile application 105 includes main Network Portability and Product Management screen 540. In some designs, from the main Network Portability and Product Management screen 540, a user may actively manage Wi-Fi and IoT network portability by selecting from the links to mobile application 105, including: Manage Wi-Fi Portability, Add Wi-Fi Spot, and Add IoT Device. In some embodiments, mobile application 105 may present to the user 100 one or more offer 545 for from a Product Provider. In some examples, an offer from a Product Provider may include Wi-Fi portability service to a user 100. In various designs, an offer of Wi-Fi portability service to the user 100 may associate a user identification with user registration information supplied through a user name and password login screen 550. In an illustrative example, the user 100 may identify available portability locations through Add Wi-Fi Spot screen 555. In some examples, Add Wi-Fi Spot screen 555 may include an option for the user 100 to redeem a coupon for portability service at a Product Provider location. In various examples, the user 100 may use Wi-Fi Spot screen 555 to browse for Portability locations near the current location of user 100. In various embodiments, Portability services offered 558 by one or more Product Provider may be presented to the user 100. In some designs, a map 561 combining a display of Portability services and Product Offerings may be presented to the user 100. In an illustrative example, the user 100 may browse portability and product offerings, select combined offers, and add 564 a selected combination of portability and product preferences to the user's Wi-Fi portability profile.

Figure 5C:
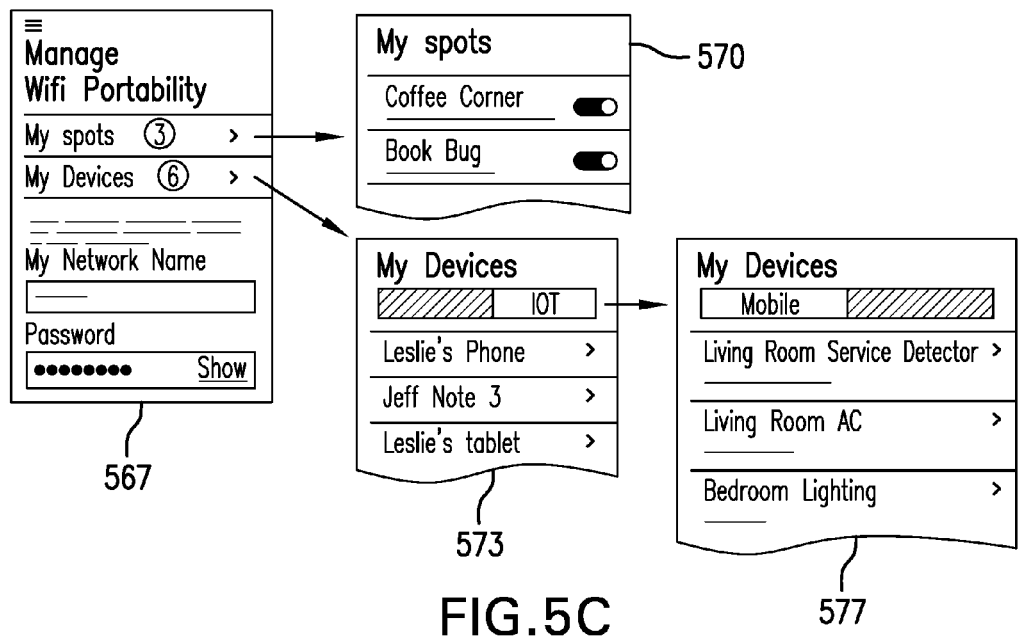

In FIG. 5C, a screenshot of an exemplary mobile application 105 includes an interface 567 for the user 100 to Manage Wi-Fi Portability. In some embodiments, from the Manage Wi-Fi Portability interface 567, the user 100 may browse their configured Wi-Fi portability locations. In some designs, the Wi-Fi portability locations may be associated with one or more Product Provider relationship to the user 100. In various implementations, the user 100 may browse and configure the devices configured for portability in the My Devices screen 573. In various designs, thy My Devices screen 573 may expand to allow the user to browse and configure 577 each of the user's devices. In some designs, the user may be able to browse and configure portability for the user's IoT devices.

Figure 5D:
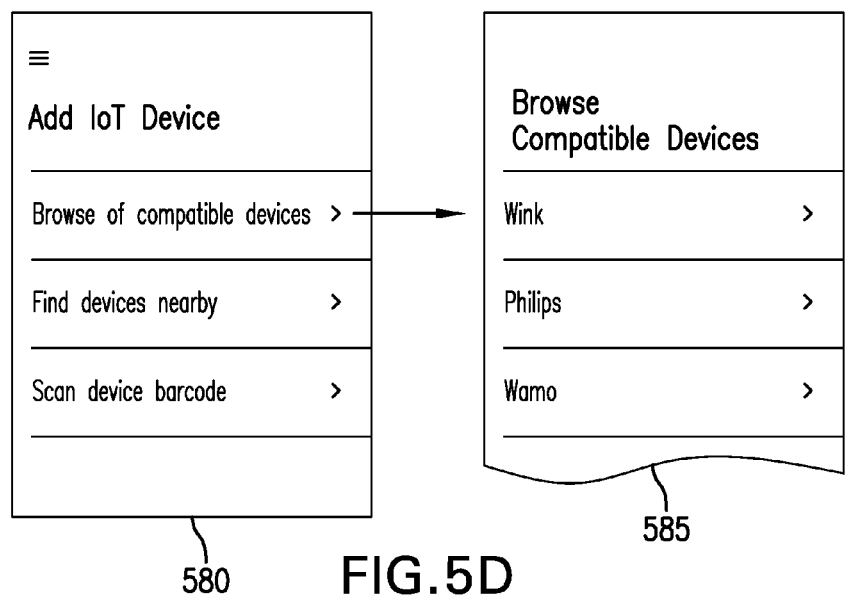

In FIG. 5D, a screenshot of an exemplary mobile application 105 includes an Add IoT Device menu 580. In some examples, Add IoT Device menu 580 may present to the user options to Browse all compatible IoT devices, Find IoT devices, and Scan device barcode. In various designs, the Browse all compatible devices option may display 585 a list of compatible IoT devices categorized by IoT device vendor, manufacturer, or IoT device capability.

Figure 6:
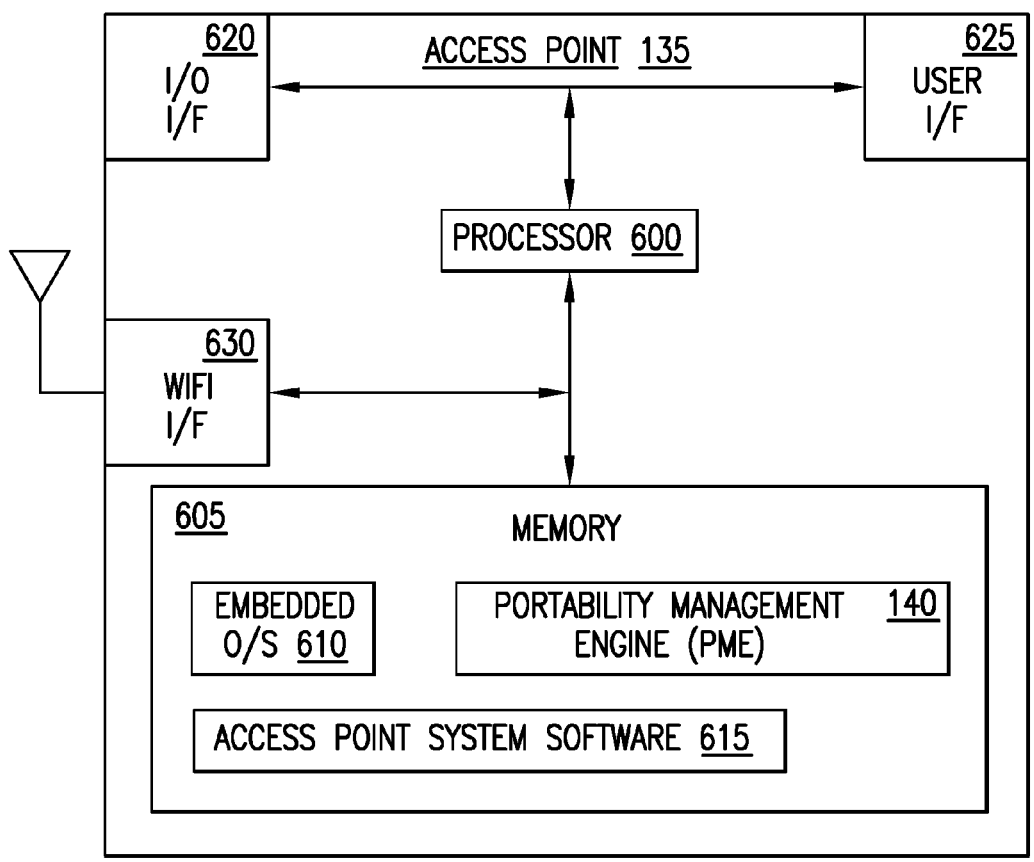
FIG. 6 depicts a structural view of an exemplary access point having a Portability Management Engine (PME).

FIG. 6 depicts a structural view of an exemplary access point having a Portability Management Engine (PME). In FIG. 6, an exemplary access point 135 includes a processor 600 that is in electrical communication with memory 605. The depicted memory 605 also includes data and program instructions to implement Embedded O/S 610, Access Point System Software 615, and Portability Management Engine (PME) 140. In some designs, Access Point System Software 615 may include an Application Programming Interface (API) operatively coupled to the Portability Management Engine (PME) 140. The processor 600 is communicatively coupled to user interface 625 to receive user input and provide user output. The processor 600 is configured to communicate with a wireless network via a Wi-Fi interface 630. In some examples, the processor 600 may be configured to communicate with a wireless network via other interfaces. In an illustrative example, the processor 600 may be configured to communicate with more than one wireless network, via more than one interface. In various embodiments, the access point 135 may include a Broadband Wireless Access (BWA) interface. In some designs, the access point may include a Bluetooth interface.

Figure 7:
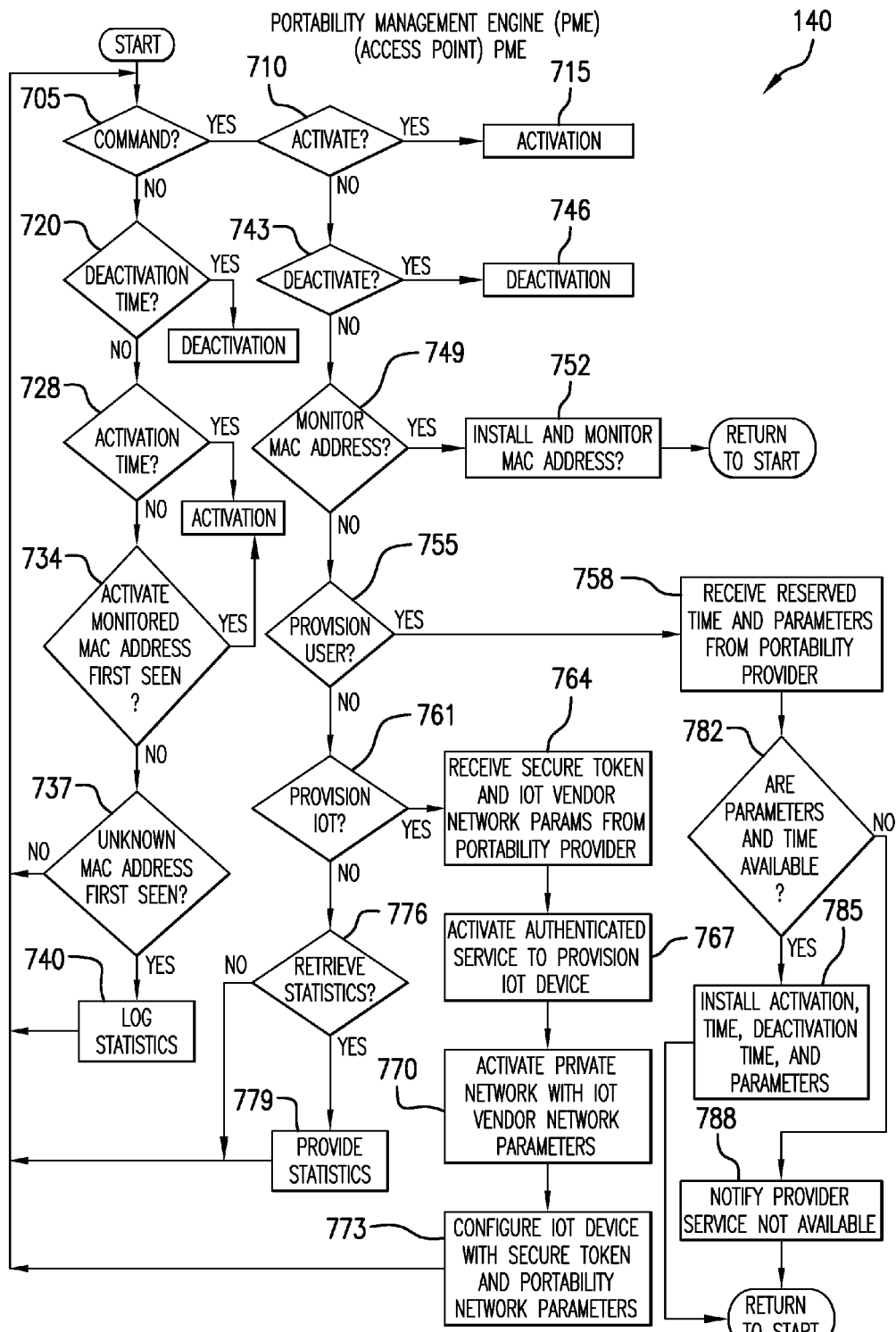
FIG. 7 depicts a process flow of an exemplary Portability Management Engine (PME).

FIG. 7 depicts a process flow of an exemplary Portability Management Engine (PME). The method depicted in FIG. 7 is given from the perspective of the Portability Management Engine (PME) 140 executing as program instructions on processor 600, depicted in FIG. 6. In some embodiments, the Portability Management Engine (PME) 140 may execute as a cloud service communicatively coupled to system services, hardware resources, or software elements local to and/or external to access point 135. The depicted method 700 begins with the processor 600 determining 705 if the Portability Management Engine 140 has a command to process. Various types of commands may be received from an entity controlling the Portability Management Engine (PME) 140. For example, data may be received via Wi-Fi interface 630 and the processor 600 may analyze received data to determine if commands are present in the data received. For example, commands to retrieve status, configure parameters, or provision portable Wi-Fi networks may be received via Wi-Fi interface 630, and processed by the processor 600. If the processor 600 determines a command is to be processed, the processor determines 710 if the command is to activate a network. If the processor 600 determines the command is to activate a network, the processor 600 activates 715 one or more Wi-Fi networks. In various examples, the processor 600 may activate one or more networks by configuring one or more Wi-Fi interfaces with predetermined network parameters, and enabling the Wi-Fi radio to broadcast the SSID for the network. In various implementations, network activation may include configuring a scheduled deactivation time. In various embodiments, a deactivation time may be supplied with an activation command. In some examples, predetermined network parameters may include the SSID, password, and encryption parameters predetermined to govern a user's personal network. In some embodiments, the processor 600 may initiate capture of the network usage and activity of devices using an activated network. In various examples, the processor 600 may monitor, log, or store in a database the captured network usage and activity of devices using the activated network.

When processor 600 has activated the one or more networks, the method continues at step 705. If the processor 600 determines no command is to be processed, the processor determines 720 if the scheduled deactivation time for one or more provisioned Wi-Fi networks has been reached. If the processor 600 determines the scheduled deactivation time for one or more provisioned Wi-Fi networks has been reached, the processor 600 deactivates 725 the one or more Wi-Fi network. In some embodiments, the processor 600 may deactivate a Wi-Fi network by disabling the SSID broadcast by the Wi-Fi radio for the network, and removing the network's configured parameters from the Wi-Fi interfaces. In some examples, deactivated network parameters, including passwords and SSIDs, and user identifiable information, such as account information and usage history, may be securely deleted, encrypted, or recycled to be made available for provisioning to another user. In various embodiments, usage data or statistics representative of the usage of the deactivated network may be logged, stored in a database, or shared with partner entities.

If the processor 600 determines the scheduled deactivation time for one or more networks has not been reached, the processor 600 determines 728 if the scheduled activation time for one or more provisioned Wi-Fi networks has been reached. If the processor 600 determines the scheduled activation time for one or more provisioned Wi-Fi networks has been reached, the processor 600 activates 731 the one or more Wi-Fi network. In various examples, the processor 600 may activate one or more networks by configuring one or more Wi-Fi interfaces with predetermined network parameters, and enabling the Wi-Fi radio to broadcast the SSID for the network. In various designs, the activated network may be configured in a VLAN private to the user. In some examples, a deactivation time may have been configured. In various implementations, if a deactivation time has not been configured, network activation may include configuring a scheduled deactivation time. In various embodiments, a deactivation time may be scheduled at the time of activation. In some embodiments, a default deactivation time may be determined based on network usage levels. For example, if the network is heavily loaded and many users are waiting for access, the default deactivation time may be set earlier than if the network is idle. In some examples, predetermined network parameters may include the SSID, password, and encryption parameters predetermined to govern a user's personal network. In some embodiments, the processor 600 may initiate capture of the network usage and activity of devices using an activated network. In various examples, the processor 600 may monitor, log, or store in a database the captured network usage and activity of devices using the activated network. If the processor 600 determines the scheduled activation time for one or more provisioned Wi-Fi networks has not been reached, the processor 600 determines 734 if a monitored MAC address has appeared for the first time. In some examples, the PME 140 may be configured to monitor for the presence, within Wi-Fi radio range, of one or more MAC Address or other wireless device identifier. In some embodiments, the PME 140 may be configured to activate a network for the user of the device with the monitored MAC address or other wireless device identifier, when the device presence is detected. In various designs, the PME 140 may be configured to immediately report to a controlling entity the detection of a monitored MAC address, whether or not the PME 140 has been configured to activate a network for the detected MAC address. If the processor 600 determines that a monitored MAC Address has appeared for the first time, and if the PME 140 has been configured to activate a network for the user of the monitored MAC address, the processor 600 may activate 731 one or more Wi-Fi network for the user of the MAC address by configuring one or more Wi-Fi interfaces with predetermined network parameters, and enabling the Wi-Fi radio to broadcast the SSID for the network. In some examples, predetermined network parameters may include the SSID, password, and encryption parameters predetermined to govern a user's personal network. In various designs, the activated network may be configured in a VLAN private to the user. In some examples, a deactivation time may have been configured. In various implementations, if a deactivation time has not been configured, network activation may include configuring a scheduled deactivation time. In various embodiments, a deactivation time may be scheduled at the time of activation. In some embodiments, a default deactivation time may be determined based on network usage levels. For example, if the network is heavily loaded and many users are waiting for access, the default deactivation time may be set earlier than if the network is idle. In various embodiments, the deactivation time may be dynamically determined by device activity or absence. For example, for a network activated in response to detection of the activity of a MAC address or other wireless identifier, the deactivation time may be dynamically determined based on the disappearance of the device from the network. For example, the network may be activated when a monitored device appears, and the same network may be deactivated when the monitored device disappears. In some embodiments, the processor 600 may initiate capture of the network usage and activity of devices using an activated network. In various examples, the processor 600 may monitor, log, or store in a database the captured network usage and activity of devices using the activated network. If the processor 600 determines that a monitored MAC Address has not appeared for the first time, the processor 600 determines 737 if any previously unknown MAC address has appeared. In some examples, the PME 140 may be configured to immediately report to a controlling entity the detection of a previously unknown MAC address. If a previously unknown MAC address has appeared, the processor 600 logs 740 the previously unknown MAC address, updates the list of previously seen MAC addresses with the new address, logs network statistics and network usage data for connected and active network devices, and the method continues at step 705, with the processor 600 determining if the Portability Management Engine (PME) 140 has a command to process.

If at step 705 the processor 600 determines a command is to be processed, the processor determines 710 if the command is to activate a network. If the processor 600 determines the command is not to activate a network, the processor 600 determines 743 if the command is to deactivate a network. In some embodiments, deactivation may be invoked automatically based on a configured deactivation time. In various implementations, deactivation may be in response to a deactivation command from a controlling entity. In some designs, the deactivation command may identify one or more Wi-Fi network to be deactivated. If the processor 600 determines the command is to deactivate a network, the processor 600 deactivates 746 the one or more Wi-Fi network. In some embodiments, the processor 600 may deactivate a Wi-Fi network by disabling the SSID broadcast by the Wi-Fi radio for the network, and removing the network's configured parameters from the Wi-Fi interfaces. In various embodiments, usage data or statistics representative of the usage of the deactivated network may be logged, stored in a database, or shared with partner entities. In some designs, deactivated network parameters, including passwords and SSIDs, and user identifiable information, such as account information and usage history, may be securely deleted, encrypted, or recycled to be made available for provisioning to another user.

If the processor 600 determines the command is not to deactivate a network, the processor 600 determines 749 if the command is to monitor a MAC address or other wireless device identifier. If the processor 600 determines the command is to monitor a MAC address or other wireless device identifier, the processor 600 installs 752 the MAC address or other wireless device identifier in the list of monitored identifiers, and begins monitoring for the identifier. In various implementations, the command to monitor for a wireless identifier may specify one or more identifiers and time windows to monitor for the identifiers. In some designs, the PME 140 may monitor for and log or report the presence of some wireless identifiers during configured monitoring time windows, and ignore the presence of wireless identifiers outside configured monitoring time windows. Then, the method continues at step 705, with the processor 600 determining if the Portability Management Engine (PME) 140 has a command to process.

If at step 705 the processor 600 determines a command is to be processed, the processor determines 710 if the command is to activate a network. If the processor 600 determines the command is not to activate a network, the processor 600 determines 743 if the command is to deactivate a network. If the processor 600 determines the command is not to deactivate a network, the processor 600 determines 749 if the command is to monitor a MAC address or other wireless device identifier. If the processor 600 determines the command is not to monitor a MAC address or other wireless device identifier, the processor 600 determines 755 if the command is to provision portability service to a user. If the processor 600 determines the command is to provision portability service to a user, the processor 600 receives 758 from an entity controlling the PME 140 the requested activation time, deactivation time, and network parameters. In some embodiments, the entity controlling the PME 140 may be a Portability Provider. In various implementations, the entity controlling the PME 140 may be a Product Provider. In some examples, the requested network parameters may include encryption type, password, and SSID. In various designs, the command to provision portability service to a user may identify the user. In some embodiments, the command to provision portability service to a user may specify the network parameters. In an illustrative example, the command to provision portability service to a user may request the PME 140 to generate custom parameters based on user profile information. In some examples, custom network parameters may be generated by the PME 140 based on a user's relationship to a product provider. Then, the processor 600 determines 782 if the requested network parameters, activation time, and deactivation time are available for the requested portability network. In some embodiments, a determination that service is available or not available may be based on the processor 600 correlating the requested activation time or deactivation time with previously provisioned or scheduled activation and deactivation times for networks hosted by access point 135. In some designs, a determination that service is available or not available may be based on the processor 600 correlating requested network parameters with previously provisioned or scheduled network parameters. In various implementations, a determination that service is available or not available may be based on the processor 600 determining the operational status of one or more of: access point 135 hardware, system software, or operating system resources. In some examples, a determination that service is available or not available may be based on the processor 600 determining the operational status of one or more network communicatively coupled to access point 135. If the processor 600 determines the requested network parameters, activation time, and deactivation time are not available, the processor 600 notifies 788 the entity controlling the PME 140 that the requested service is not available. If, at step 782, the processor 600 determines the requested network parameters, activation time, and deactivation time are available, the processor installs 785 the provisioned network activation time, deactivation time, and the network parameters. In various implementations, the PME 140 may monitor the time, activate the provisioned network at the activation time, and deactivate the provisioned network at the deactivation time. Then, the method continues at step 705, with the processor 600 determining if the Portability Management Engine (PME) 140 has a command to process.

If at step 705 the processor 600 determines a command is to be processed, the processor determines 710 if the command is to activate a network. If the processor 600 determines the command is not to activate a network, the processor 600 determines 743 if the command is to deactivate a network. If the processor 600 determines the command is not to deactivate a network, the processor 600 determines 749 if the command is to monitor a MAC address or other wireless device identifier. If the processor 600 determines the command is not to monitor a MAC address or other wireless device identifier, the processor 600 determines 755 if the command is to provision portability service to a user. If the processor 600 determines the command is not to provision portability service to a user, the processor 600 determines 761 if the command is to provision portability service to a user's IoT devices, the processor 600 receives 764 from the entity controlling the PME 140 a secure token and network parameters governing an IoT vendor's network. In various examples, the IoT device to be provisioned with portability service to the user's personal network may be currently activated exclusively on the IoT vendor's network. In some examples, the entity controlling the PME 140 may be a Portability Provider. In various designs, the entity controlling the PME 140 may be a Product Provider. In some implementations, the secure token may certify a user's ownership of the IoT device to be provisioned with portability service. In various implementations, the secure token may be a PGP key. In some designs, the secure token may be cryptographically signed by the user. In some examples, the secure token may be cryptographically signed by the IoT device vendor. Then, the processor 600 configures 767 the PME 140 to host on access point 135 an authenticated network service adapted to provision portability service to a user's IoT device. Then, the processor 600 configures and temporarily activates 770 a network governed by the same network parameters governing the IoT vendor's network. In some designs, the authenticated network service may be configured to provide a listening SSH server port, on the temporary network governed by the same network parameters governing the IoT vendor's network. Then, the processor 600 configures 778 the IoT device for portability access on the user's personal network by presenting the secure token with the user's personal network parameters when the IoT device connects to the authenticated network service. In some designs, the IoT device may be configured prior to the connection to the authenticated network service, to accept new network parameters presented with a valid secure token. In various implementations, the authenticated network service may be deactivated after one or more IoT device are provisioned on the user's personal network. In some embodiments, the temporary network, governed by the network parameters governing the IoT vendor's network, may be deactivated after the IoT device is provisioned. If, at step 761, the processor 600 determines the command is not to provision portability service to a user's IoT devices, the processor 600 determines 776 if the command is to retrieve statistics. If the command is to retrieve statistics, the processor 600 reports statistics and usage data to the entity controlling the PME 140. In various implementations, the command to retrieve statistics may specify the statistics to retrieve and report. Then, the method continues at step 705, with the processor 600 determining if the Portability Management Engine 140 has a command to process.

Figure 8:
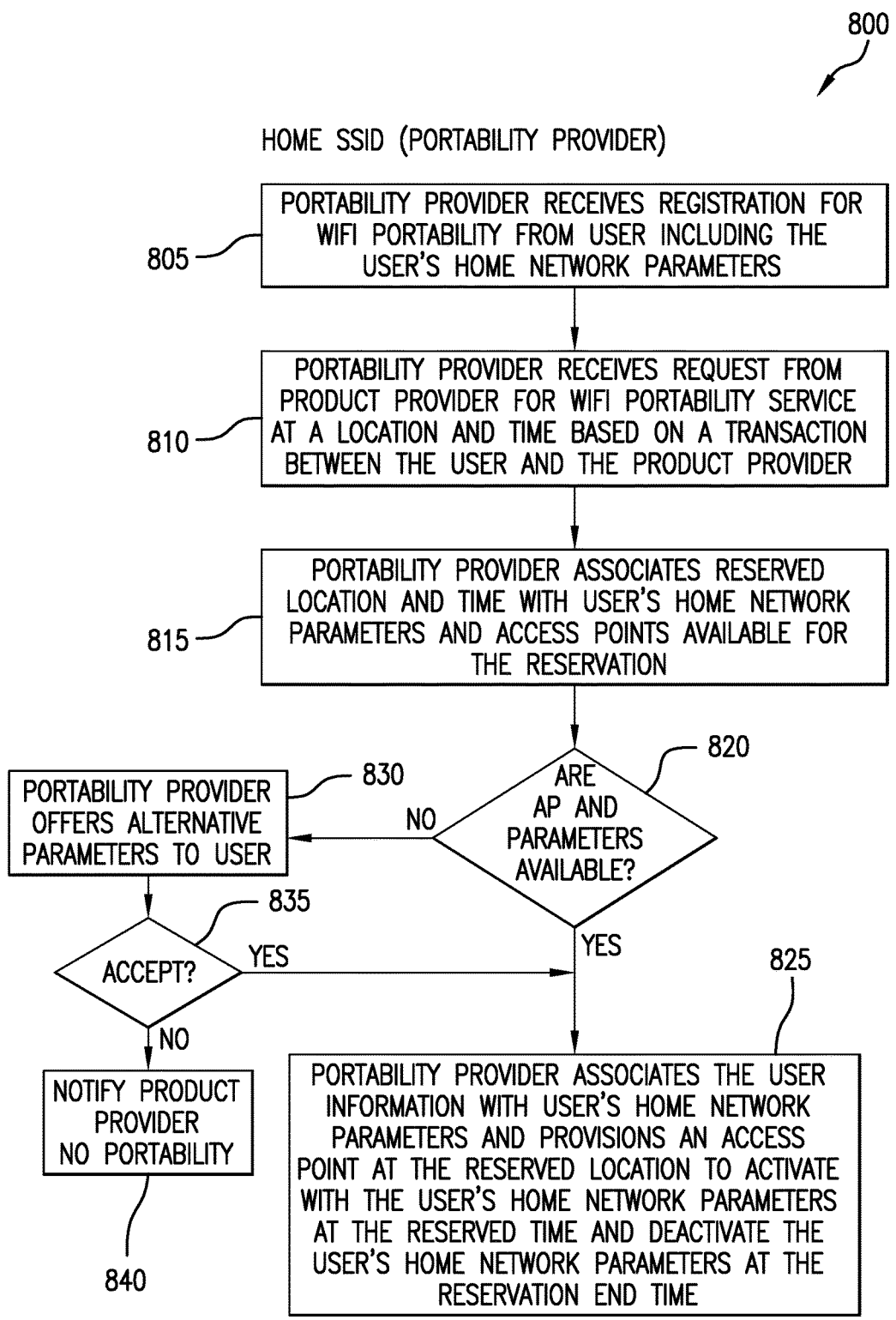
FIG. 8 depicts a process flow of an exemplary Portability Provider configuring a remote Wi-Fi access point with parameters governing a user's personal network, in response to a transaction between the user and the Product Provider.

FIG. 8 depicts a process flow of an exemplary Portability Provider configuring a remote Wi-Fi access point with parameters governing a user's personal network, in response to a transaction between the user and the Product Provider. The method depicted in FIG. 8 is given from the perspective of an exemplary Portability Provider 160 executing as a cloud service, and interacting with an exemplary Product Provider 145, both depicted in FIG. 1. The depicted method 800 begins with the Portability Provider 160 receiving 805 from a user 100 registration for Wi-Fi portability service to the user 100. In various embodiments, registration for portable Wi-Fi service to the user 100 may include identification of the user 100. In some examples registration for portable Wi-Fi service to the user 100 may include network parameters governing the personal network of the user 100. The method continues with the Portability Provider 160 receiving 810 a request from the Product Provider 145 to provide Wi-Fi portability service to the user 100, at a location and time based on a transaction between the user 100 and the Product Provider 145. In some examples, the transaction between the user 100 and the Product Provider 145 may be a purchase transaction, a reservation, or an arrival without a reservation. In an illustrative example, the location and time based on the transaction between the user 100 and the Product Provider 145 may be the single physical location and time of the user 100. In some examples, the location and time based on the transaction between the user 100 and the Product Provider 145 may be a series of locations and times, based on a reservation or a group of reservations. For example, a traveler may arrange reservations over a period of weeks, including hotels, cruise ship cabins, airline seats, airport gates, and rental cars, each of which have at least one associated location and time. In various embodiments, the Product Provider 145 request may include specific locations and times. In some embodiments, the Product Provider 145 request may include ranges of locations and times. In some designs, the Product Provider 145 request may include locations or times to be excluded from those locations or times at which Wi-Fi portability service may be provided to the user 100. The method continues with the Portability Provider 160 associating 815 the user 100 registration, the Product Provider 145 request for Wi-Fi portability service, and the available locations and times to provide W-Fi portability service. In some embodiments, the Portability Provider 160 may determine available locations and times to provide Wi-Fi portability service to user 100 based on matching access points having available capacity, features, or capabilities, to host Wi-Fi networks with the requested location and time received from the Product Provider 145. In some implementations, the Portability Provider 160 may determine available locations and times to provide Wi-Fi portability service to user 100 based on matching access points having available time windows to host Wi-Fi networks with both the requested location and time received from the Product Provider 145 and the network parameters received with the registration from the user 100. The method continues with the Portability Provider 160 determining 820 if an access point is available at the requested location and time received from the Product Provider 145 and with the network parameters received with the registration from the user 100. In some embodiments, the Portability Provider 160 may employ one or more access point 135, depicted in FIG. 1, to provide Wi-Fi portability service. In various examples, the access point 135 employed by the Portability Provider 160 may include a Portability Management Engine 140, depicted in FIG. 1 and described in FIG. 7. In some designs, the Portability Provider 160 may facilitate provisioning Wi-Fi portability service, including determining available locations and times, by employing one or more access point 135 and Portability Management Engine 140. If the Portability Provider 160 determines no access point is available at the requested location and time to be activated with the network parameters of the user 100, the Portability Provider 160 may offer 830 alternative network parameters to the user 100. The method continues with the Portability Provider 160 determining 835 if the user 100 accepts the alternative network parameters. If the Portability Provider 160 determines the user does not accept the alternative network parameters, the method ends 840. If the Portability Provider 160 determines the user accepts the alternative network parameters, the Portability Provider 160 provisions 825 an access point at the reserved location to activate with the alternative network parameters at the reserved time, and deactivate at the reservation end time.

If, at step 820, the Portability Provider 160 determines at least one access point is available at the requested location and time to be activated with the network parameters of the user 100, the Portability Provider 160 provisions 825 an access point at the reserved location to activate with network parameters governing the personal network of the user 100 at the reserved time and deactivate at the reservation end time.

Figure 9:
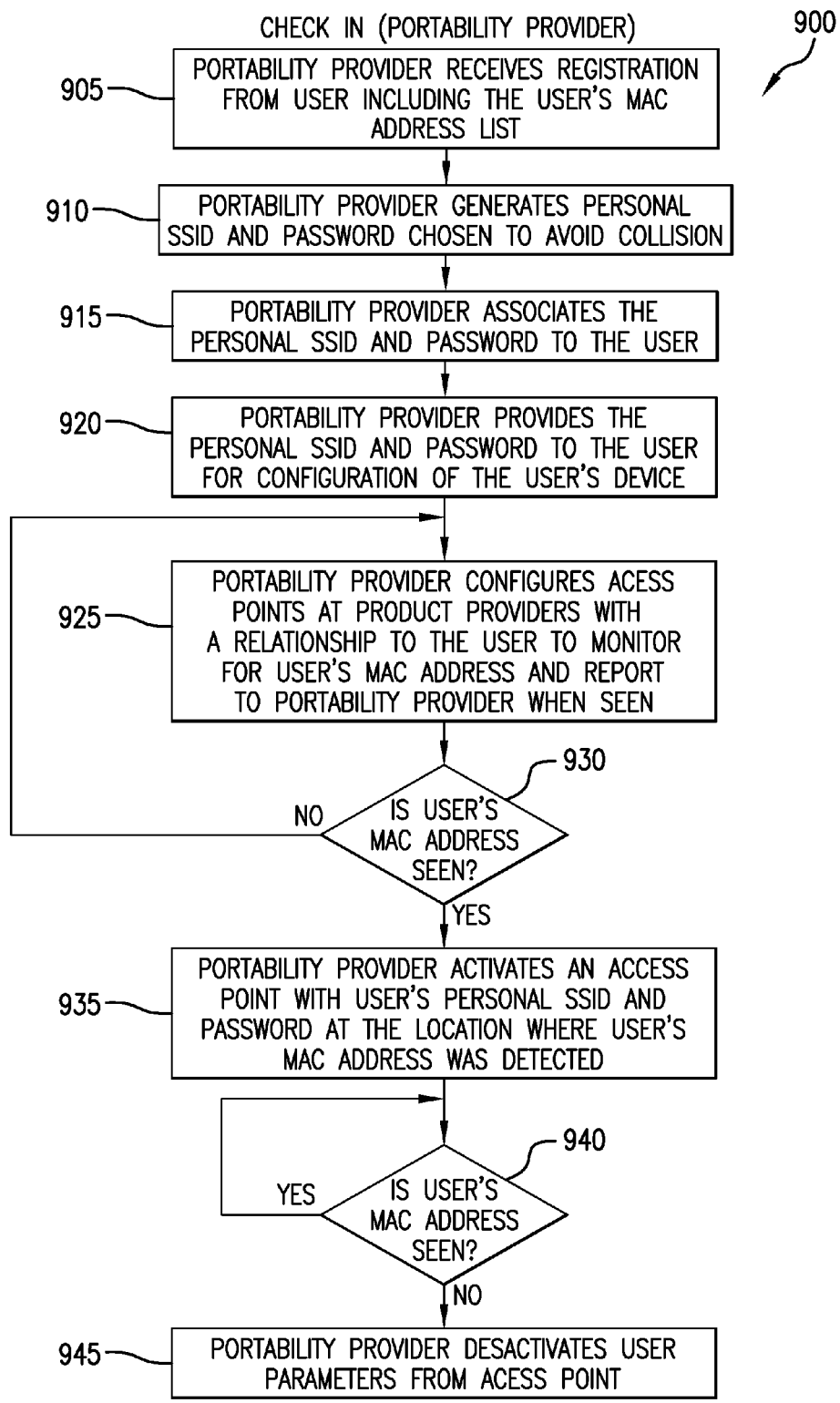

FIG. 9 depicts a process flow of an exemplary Portability Provider configuring a remote Wi-Fi access point with parameters generated by the Portability Provider based on a user's relationship with an exemplary Product Provider, in response to the user's check-in. The method depicted in FIG. 9 is given from the perspective of the Portability Provider 160 executing as a cloud service and depicted in FIG. 1. The depicted method 900 begins with the Portability Provider 160 receiving 905 from a user 100 registration for Wi-Fi portability service to the user 100. In various embodiments, registration for portable Wi-Fi service to the user 100 may include identification of the user 100. In some examples registration for portable Wi-Fi service to the user 100 may include network parameters governing the personal network of the user 100. In various designs, registration for portable Wi-Fi service to the user 100 may include a list of wireless device identifiers for devices controlled by the user 100. In some implementations, wireless device identifiers may include MAC addresses. The method continues with the Portability Provider 160 generating 910 for the user 100 personal network parameters based on the relationship of the user to a Product Provider. In some examples, the generated personal network parameters may include a customized SSID and password. In various examples, the customized SSID and password may be chosen to avoid collision with the network parameters chosen for other users. The method continues with the Portability Provider 160 associating 915 the generated personal network parameters to the user registration. In various examples, the association of the generated network parameters to the user 100 registration may include storing the user 100 MAC address list with the user 100 identification, SSID, and password. The method continues with the Portability Provider 160 providing 920 the generated network parameters to the user 100, for configuration in the user's devices. In an illustrative example, the Portability Provider 160 may provide the network parameters to the user via the mobile application 105. In some embodiments, the mobile application 105 may configure the generated network parameters in the device hosting mobile application 105. In some examples, mobile application 105 may coordinate with the Portability Provider 160 to generate network parameters determined as a function of a shared secret. In some designs, mobile application 105 may coordinate with the Portability Provider 160 to generate network parameters determined based on a cryptographically secure one-time password. For example, a cryptographically secure one-time password may be generated between two parties based on a shared secret and the OATH framework. The method continues with the Portability Provider 160 configuring 925 at least one access point 135 at Product Provider 145 locations to monitor for the MAC address of the user's device. The Portability Provider 160 configures the access point 135 to report to the Portability Provider 160 when the MAC address of the user's device is first detected. The method continues with the Portability Provider 160 determining 930 if the user's MAC address has been detected by access point 135 at the Product Provider 145 location. In various examples, the determination the user's MAC address has been detected may be based on an autonomous report from the access point 135 of a monitored MAC address detection. In some designs, the determination the user's MAC address has been detected may be based on the result of a query command to the Portability Management Engine 140 hosted on access point 135 for the detection status of a monitored MAC address. If the Portability Provider 160 determines the user's MAC address has not been detected, the method continues at step 925. If the Portability Provider 160 determines the user's MAC address has been detected, the Portability Provider 160 activates 935 an access point with the user's personal SSID and password at the location where the user's MAC address was detected. In some examples, the Portability Provider 160 may configure the access point to periodically monitor for the continued presence or activity of the user's MAC address. In various designs, the Portability Provider 160 may configure the access point to report to the Portability Provider when the monitored MAC address is no longer detected at the access point. In some implementations, the Portability Provider 160 may configure the access point to monitor the continued presence or activity of the user's MAC address for a configured period of time. The method continues with the Portability Provider 160 determining 940 if the user's MAC address remains active as detected by access point 135 at the Product Provider 145 location. If the Portability Provider 160 determines the user's MAC address remains active, the method continues at step 940. If the Portability Provider 160 determines the user's MAC address is not active, the Portability Provider 160 deactivates the network governed by the user's personal SSID and password at the location where the user's MAC address was first detected.

FIG. 10 depicts a process flow of an exemplary Product Provider configuring a remote Wi-Fi access point with parameters generated by a Portability Provider based on a user's relationship with the Product Provider, in response to the user's transaction with the Product Provider. The method depicted in FIG. 10 is given from the perspective of the Product Provider 145 executing as a cloud service and depicted in FIG. 1. The depicted method 1000 begins with the Product Provider 145 completing 1005 a transaction for fulfillment at a location and time with the user 100. In some examples, the transaction between the user 100 and the Product Provider 145 may be a purchase transaction, a reservation, or an arrival without a reservation. In an illustrative example, the location and time based on the transaction between the user 100 and the Product Provider 145 may be the single physical location and time of the user 100. In some examples, the location and time based on the transaction between the user 100 and the Product Provider 145 may be a series of locations and times, based on a reservation or a group of reservations. For example, a traveler may arrange reservations over a period of weeks, including hotels, cruise ship cabins, airline seats, airport gates, and rental cars, each of which have at least one associated location and time. The method continues with the Product Provider 145 requesting 1010 Wi-Fi portability service from the Portability Provider 160 to the user 100 at a location and time based on the transaction between the user 100 and the Product Provider 145. In various embodiments, the Product Provider 145 may include the user 100 identification with the request to the Portability Provider 160. For example, user identification may include an account identifier of the user 100. In various designs, the account identifier of the user 100 may be known to both the Product Provider 145 and the Portability Provider 160. In some examples, the Product Provider 145 may include with the request to the Portability Provider 160 information representative of the relationship of the user 100 to the Product Provider 145. For example, the Product Provider 145 may include user profile information with the request, containing or referencing the purchase history, product provider account number, or product preferences of the user 100. In some embodiments, the user profile information may include payment methods. In various implementations, one or more response of the Portability Provider 160 to the request for Wi-Fi portability service to the user 100 may in part be based on associating a user account identifier and related Portability Provider records with network parameters already associated to the same user 100 in the Portability Provider 160 records. The method continues with the Product Provider 145 determining 1015 if the requested Wi-Fi portability service is available for the user 100 at the requested location and time. In various implementations, the determination by the Product Provider 145 of the availability of Wi-Fi portability service for the user 100 at the requested location and time may be based on the response from the Portability Provider 160. In some designs, the Product Provider 145 may determine if Wi-Fi portability service is available based on one or more requests by the Product Provider 145 to the Portability Management Engine Application Programming Interface (PME API) 170. If the Product Provider 145 determines the requested Wi-Fi portability service is available for the user 100 at the requested location and time, the method continues with the Product Provider 145 receiving 1020 from the Portability Provider 160 custom network parameters. The custom network parameters received from the Portability Provider 160 are to be configured in the device of the user 100. The custom network parameters received from the Portability Provider 160 will also be provisioned by the Portability Provider 160 and activated in an access point for the user 100 during the time and at the location determined as a function of the transaction. In an illustrative example, the custom network parameters may be generated by the Portability Provider 160 based on user information including account name, preferences, or history. The method continues with the Product Provider 145 providing 1025 to the user 100 the custom network parameters received from the Portability Provider 160. In various examples, the user 100 may configure the user device with the custom network parameters. In some embodiments, mobile application 105 hosted on the user 100 device may configure the custom network parameters in the user 100 device. The method continues with the Product Provider 145 receiving 1030 from the Portability Provider 160 network usage data associated with the user 100. In various implementations, the network usage data may be received from the Portability Provider 160 via the PME API 170. If, at step 1015, the Product Provider 145 determines the requested Wi-Fi portability service is not available for the user 100 at the requested location and time, the Product Provider 160 determines 1035 if available alternative locations or times exist to provide Wi-Fi portability service to user 100. In some embodiments, the Product Provider 145 determination of available alternative locations or times may be based on proprietary user knowledge retained by the Product Provider 160. For example, the Product Provider records may indicate the user 100 has specified preference rankings of locations and times for portability service. In some examples, the Product Provider 145 may request alternative locations or times from the Portability Provider 160 via the PME API 170. For example, using the PME API 170, the Product Provider 145 may determine an SSID is available for the user in one hour at the requested location, or at a nearby location at the current time. If the Product Provider 160 determines available alternative locations or times do not exist to provide Wi-Fi portability service to user 100, the Product Provider 145 notifies 1055 the user no Wi-Fi portability service is available, and the method continues at step 1005. If the Product Provider 160 determines available alternative locations or times exist to provide Wi-Fi portability service to user 100, the Product Provider 160 offers 1040 the alternative location or time to the user. The method continues with the Product Provider 145 determining 1045 if the user accepted the alternative location or time. If the user accepted the alternative location or time, the Product Provider 145 notifies 1050 the Portability Provider 160 that the user accepted the offer of an alternative location or time, and the method continues at step 1020. If the user 100 did not accept the offer of an alternative location or time, the method continues at step 1055.

FIG. 11 depicts a process flow of an exemplary Product Provider collaborating with at least one Portability Provider to configure a remote Wi-Fi access point with parameters predetermined based on a user's relationship to at least one Portability Provider. The method depicted in FIG. 11 is given from the perspective of the Product Provider 145 executing as a cloud service and depicted in FIG. 1. The depicted method 1100 begins with the Product Provider 145 detecting 1105 a MAC address not associated to a user having a relationship with the Product Provider 145. In various embodiments, the Product Provider 145 may detect a MAC address with one or more requests for user information and MAC address lists through PME API 170. In some embodiments, the Product Provider 145 may determine the relationship to the user by associating user identification from Product Provider records with portability history data obtained with one or more requests through PME API 170. In some examples, the Product Provider 145 may maintain relationships and contact methods with one or more Portability Provider. The method continues at step 1110 with the Product Provider 145 requesting Wi-Fi portability service for the user from at least one Portability Provider. In an illustrative example, the Product Provider 145 may request Wi-Fi portability service for the user from multiple Portability Providers. In some implementations, the Product Provider 145 may control access points for provisioning Wi-Fi portability service. The method continues at step 1115 with the Product Provider 145 determining if the user has a relationship with a Portability Provider. In some examples, if the user is determined to have a relationship with a Portability Provider, that Portability Provider may be preferred in arranging portability service for the user. If the Product Provider 145 determines the user does not have a relationship with a Portability Provider, the method continues at step 1140 with the Product Provider 145 logging the failed attempt to provide portability service, and the method ends. In some examples, the Product Provider 145 may report the MAC address to one or more Portability Providers. If the Product Provider 145 determines the user has a relationship with at least one Portability Provider, the method continues at step 1120 with the Product Provider 145 negotiating with the Portability Providers having a relationship to the user, to provide Wi-Fi portability service to the user at the location and time the MAC address of the user's device was detected. If the negotiation with Portability Providers to provide Wi-Fi portability service to the user is not successful, the method continues at step 1140 with the Product Provider 145 logging the failed attempt to provide portability service, and the method ends. Upon negotiation successful to nominate at least one Portability Provider to provide Wi-Fi portability service to the user, the method continues at step 1130 with the Product Provider 145 receiving from the nominated Portability Provider a secure token including the user's custom network parameters, predetermined based on the user's relationship to the portability provider. In various examples, the secure token including the user's custom network parameters may be cryptographically signed by the user and the nominated Portability Provider. In some designs, the signed secure token may certify a trust relationship between the parties to facilitate transfer of the user's network parameters to the Product Provider. In some embodiments, the secure token may include a PGP key. The method continues at step 1135 with the Product Provider activating an access point with the user's custom network parameters, and deactivating the custom network parameters at a time based on the user's experience. In an illustrative example, the custom network may have been activated for the user at the time of an arrival for an event unknown to the Product Provider 145. In some examples, the network may be deactivated when the user stops using the activated network.

FIG. 12 depicts a process flow of an exemplary Portability Provider configuring a user's Internet of Things (IoT) devices with parameters governing the user's personal network, in response to the user providing the IoT device identifier to the Portability Provider. The method depicted in FIG. 12 is given from the perspective of the Portability Provider 160 executing as a cloud service and depicted in FIG. 1.

The depicted method 1200 begins with the Portability Provider 160 receiving 1205 from the user 100 registration including the user's personal network parameters 120 governing the user's personal network 115.

The method continues with the Portability Provider 160 receiving 1210 from the user 100 the serial number 230 of an IoT device 215 configured with network parameters 235 governing the communicative coupling of the IoT device with the IoT device vendor 225.

The method continues with the Portability Provider 160 determining 1215 if the IoT device 215 is registered to the user 100. In various designs, the Portability Provider 160 may determine the IoT device 215 is registered to the user 100 by providing the IoT device 215 serial number 230 and a secure token identifying the user 100 in a request to the IoT device vendor 225.

If the Portability Provider 160 determines the IoT device 215 is not registered to the user 100, the method continues with the Portability Provider 160 sending 1220 to the IoT device vendor 225 a configuration request including the IoT device 215 serial number, the user 100 registration, and a secure token identifying the user 100.

The method continues with the Portability Provider 160 receiving 1225 from the IoT device vendor 225 a response to the configuration request. The response from the IoT device vendor 225 may include a confirmation that the IoT device vendor 225 has accepted the IoT portability registration of user 100. In some designs, the IoT device vendor 225 may determine acceptance of the IoT portability registration of user 100 based on cryptographically authenticating a secure token provided by the Portability Provider 160. In various embodiments, a response to the configuration request may include a confirmation from the IoT device vendor 225 that the IoT device 215 has been configured to be activated with new network parameters received with the secure token upon subsequent connection to an authenticated network service accessible from the user's personal network 115.

The method continues with the Portability Provider 160 determining 1230 if the IoT device vendor 225 accepted the IoT portability registration of the user 100. If the IoT device vendor 225 does not accept the IoT portability registration, the Portability Provider 160 notifies 1235 the user no portability is available. If the IoT device vendor 225 accepts the IoT portability registration, the Portability Provider 160 receives 1240 a first set of IoT device network parameters from the IoT device vendor 225. In some embodiments, the first set of IoT device network parameters may govern the connection of the IoT device 215 to a network accessible to the IoT device vendor 225. If at step 1215 the Portability Provider 160 determines the IoT device 225 is registered to the user 100, the Portability Provider 160 may retrieve the first set of IoT device network parameters from the Portability Provider Database 165.

The method continues with the Portability Provider 160 activating 1250 the first set of IoT device 215 network parameters on the personal network 115 of user 100. Then, the Portability Provider 160 activates 1255 an authenticated network configuration service accessible from the user's personal network 115. In some designs, the authenticated network configuration service is adapted to facilitate configuration of an IoT device with new network parameters. In various implementations, upon connection of the IoT device 215 to the authenticated network configuration service, the IoT device 215 may be presented with the secure token and the personal network parameters 120 governing the personal network 115 of the user 100. The method continues with the Portability Provider 160 determining 1260 if the IoT device 215 accepted the portability configuration. If the IoT device 215 accepts the portability configuration, the IoT device 215 is activated for Wi-Fi portability on the personal network 115 of the user 100, and the Portability Provider 160 updates 1265 the IoT device vendor 225 databases with the registration of IoT device 215 to user 100. If the IoT device does not accept the IoT portability registration, the Portability Provider 160 notifies 1235 the user no portability is available.

FIG. 13 depicts a process flow by an exemplary Internet of Things (IoT) device being configured with parameters governing a user's personal network, in response to the user providing the IoT device identifier to the Portability Provider. The method depicted in FIG. 13 is given from the perspective of the IoT device 215 and depicted in FIG. 1. The depicted method 1300 begins with the IoT device 215 identifiable with a barcode serial number and communicatively coupled with the IoT device vendor 225 connected 1305 via a first network governed by a first set of network parameters 235. The IoT device 215 receives 1310 from the IoT device vendor 225 a secure token, with configuration to be activated on a second network governed by a second set of network parameters 120. IoT device 215 connects 1315 to a second network using the first set of network parameters 235. In some examples, the second network may be the personal network 115 of user 100. If the IoT device 215 determines 1320 the connection to the second network failed, the IoT device 215 continues 1325 service as an IoT device with the previous network parameters. If at step 1320 the IoT device 215 determines the connection to the second network succeeded, the IoT device 215 receives 1330, from an authenticated configuration service hosted on the second network, a secure token identifying the user, and a second set of network parameters.

The method continues with the IoT device 215 determining 1335 if the secure token from the IoT device vendor 225 matches the secure token received from the authenticated configuration service. If the secure tokens do not match, the IoT device 215 continues 1325 service as an IoT device with the previous network parameters. If the secure tokens match, the IoT device 215 stores 1340 the second network parameters. Then, the IoT device 215 connects 1345 to the second network using the second network parameters. At step 1350, the IoT device 215 continues service as an IoT device with the second network parameters.

Although various embodiments have been described with reference to the Figures, other embodiments are possible. For example, in some embodiments, the network may be a broadband wireless or cellular data network. The user's personal network may be, for example, the Broadband Wireless Access (BWA) or HSPA, LTE, 3G, 4G, or WiMAX wireless data network to which the user subscribes. In various embodiments, the network may include a Bluetooth network. In some designs, the Bluetooth network may interoperate with one or more non-Bluetooth network. In an illustrative example, a wireless device identifier may be a MAC Address (to identify a Wireless Ethernet interface), a Bluetooth Device Address (to identify a Bluetooth interface), a Universally Unique Identifier (UUID) (to identify any device or entity including a Bluetooth interface), or a Mobile Equipment Identifier (MEID) (to identify any device including a Broadband Wireless Access device).

In some embodiments, personal network parameters may be generated based on a time-limited cryptographically secure one-time password. For example, a user may synchronize pseudo-random number generators between their mobile application, and a Portability Provider. Based on the synchronization, the Portability Provider and mobile application will be able to generate identical (SSID, password) parameters. The Portability Provider may then activate the generated network parameters for the user at any place and time the user's MAC address appears. The user may, at their discretion, direct the mobile application to generate the corresponding (SSID, password) parameters, and join the network. In some examples, the user's device may automatically connect to their personal network with different network parameters at each location and time, without user intervention.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method to provision portable Wi-Fi service by a portability provider, comprising:
processing user registration, comprising:
receiving user identification; and
receiving network parameters governing the user's personal network;
receiving an electronic message containing an indication of user activity related to at least one location or time; and
in response to receiving the electronic message containing an indication of user activity related to at least one location or time:
associating the user registration with the user activity;
determining at least one available place or time for portable Wi-Fi service, based on associating the user registration with the user activity and the at least one related location or time; and
configuring a network with network parameters governing the user's personal network to activate portable Wi-Fi service to the user at the at least one available place or time,
wherein the network further comprises an access point adapted to: receive parameters governing access to a plurality of Wi-Fi networks, receive configuration of an activation time and a deactivation time for each of the plurality of Wi-Fi networks, receive a plurality of Wi-Fi device identifiers, provide indication of the activity and activity time of each Wi-Fi device identifiable by one of the Wi-Fi device identifiers, activate each of the plurality of Wi-Fi networks according to the received parameters governing access to the network at the activation time for each network, and deactivate each of the plurality of Wi-Fi networks at the deactivation time for each network.

2. The method of claim 1 in which configuring a network further comprises configuring the access point to activate a second network for portable Wi-Fi service with predetermined parameters governing a first network accessible to the user.

3. The method of claim 1 in which processing user registration further comprises generating custom parameters governing the user's portable Wi-Fi service based on the registration.

4. The method of claim 1 in which the user activity further comprises a user-initiated transaction.

5. The method of claim 1 in which the user activity further comprises the user's arrival and the indication of user activity further comprises the location and time of the user's arrival.

6. The method of claim 1 in which the user activity further comprises a reservation and the indication of user activity further comprises the user's arrival for at least a portion of the reservation.

7. The method of claim 1 in which receiving an indication of user activity further comprises receiving from a product provider a request comprising data representative of a relationship of the user to the product provider.

8. The method of claim 1 in which associating the user registration with the user activity further comprises requesting from a product provider available product locations and times based on the user activity.

9. The method of claim 1 in which the indication of the activity and activity time of each Wi-Fi device further comprises reports of first seen time, last seen time, and network usage for detected Wi-Fi devices.

10. The method of claim 1 in which the access point further comprises the access point being adapted to configure each of the plurality of Wi-Fi networks in a private VLAN.

11. The method of claim 1 in which indication of the activity and activity time of each Wi-Fi device further comprises an application programming interface providing access to the network usage, activity, and activity time of each Wi-Fi device.

12. The method of claim 1 in which configuring a network further comprises sending, to an entity controlling a Wi-Fi device not activated on a network governed by the access point, the serial number of the device in combination with a secure token authenticating the user, and receiving, from the entity controlling the Wi-Fi device, network parameters governing access to a network by the Wi-Fi device in combination with a secure token authenticating the controlling entity.

13. The method of claim 12 in which the access point further comprises the access point being adapted to host an authenticated service configured to authenticate the user and the controlling entity with a secure token, and activate the Wi-Fi device with parameters governing access to a first network upon connection to the authenticated service using parameters governing access to a second network.

* * * * *